(12) United States Patent
Nasaka

(10) Patent No.: US 11,228,802 B2
(45) Date of Patent: Jan. 18, 2022

(54) VIDEO DISTRIBUTION SYSTEM, VIDEO GENERATION METHOD, AND REPRODUCTION DEVICE

(71) Applicant: Rakuten Group, Inc., Tokyo (JP)

(72) Inventor: Tomoyoshi Nasaka, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/173,294

(22) Filed: Feb. 11, 2021

(65) Prior Publication Data

US 2021/0297731 A1 Sep. 23, 2021

(30) Foreign Application Priority Data

Mar. 18, 2020 (JP) .............................. JP2020-048259

(51) Int. Cl.
*H04N 21/43* (2011.01)
*G11B 27/10* (2006.01)
*H04N 5/765* (2006.01)
*H04N 5/92* (2006.01)
*H04N 21/8547* (2011.01)
*H04N 21/2743* (2011.01)
*H04N 21/231* (2011.01)
(Continued)

(52) U.S. Cl.
CPC ..... *H04N 21/43072* (2020.08); *G11B 27/031* (2013.01); *G11B 27/10* (2013.01); *H04N 5/765* (2013.01); *H04N 5/9202* (2013.01); *H04N 21/231* (2013.01); *H04N 21/2743* (2013.01); *H04N 21/4223* (2013.01); *H04N 21/8547* (2013.01)

(58) Field of Classification Search
CPC ........... H04N 21/43072; H04N 21/231; H04N 21/2743; H04N 21/4223; H04N 21/8547; H04N 5/765; H04N 5/9202; G11B 27/031; G11B 27/10
See application file for complete search history.

(56) References Cited

U.S. PATENT DOCUMENTS

| | | | |
|---|---|---|---|
| 11,082,756 B2* | 8/2021 | Rodriguez Bravo | ........................ H04N 21/4788 |
| 2014/0192200 A1* | 7/2014 | Zagron | ................... G11B 27/11 348/159 |
| 2015/0350716 A1* | 12/2015 | Kruglick | .......... H04N 21/44008 386/241 |

FOREIGN PATENT DOCUMENTS

| | | |
|---|---|---|
| JP | 2013-229644 A | 11/2013 |
| JP | 2015-32846 A | 2/2015 |
| JP | 2020-17868 A | 1/2020 |

* cited by examiner

*Primary Examiner* — Nicholas T Corbo
(74) *Attorney, Agent, or Firm* — Sughrue Mion, PLLC

(57) ABSTRACT

A video generation device receives sound information from a distribution apparatus. The video generation device receives first timing information from the distribution apparatus. The video generation device causes a video-taking device to take a video. The video generation device reproduces one or more sounds indicated by the received sound information when the video being taken by the video-taking device. The video generation device identifies one or more timings of reproducing the one or more sounds indicated by the received sound information based on the received first timing information when the one or more sounds indicated by the received sound information being reproduced. The video generation device causes video information indicating the taken video and including second timing information indicating the one or more identified timings to be generated.

10 Claims, 17 Drawing Sheets

(51) Int. Cl.
*H04N 21/4223* (2011.01)
*G11B 27/031* (2006.01)

VIDEO DISTRIBUTION SYSTEM, VIDEO GENERATION METHOD, AND REPRODUCTION DEVICE

CROSS-REFERENCE TO RELATED PATENT APPLICATION

This application claims priority from Japanese Patent Application No. 2020-48259 filed Mar. 18, 2020, the entire disclosure of which, including the specification, the scope of claims, drawings, and abstract, is incorporated herein by reference in its entirety.

BACKGROUND

Technical Field

The present invention relates to a method for generating video information by taking a video while reproducing one or more sounds.

Related Art

Conventionally, there is known a video sharing platform that makes posting of a video created by a user possible and distributes the posted video such that other users can view the video (for example, JP 2013-229644 A). A video taken by a camera is mainly uploaded to the video sharing platform. A video in which someone moves to reproduced sounds may be posted. For example, a video in which someone dances to music is well known. In this case, for example, by performing recording using a microphone or the like when taking a video, the video with sounds is generated.

SUMMARY

However, the quality of sounds included in a generated video is inferior to the quality of original sounds because the sounds recorded includes noises other than the original sound, for example.

The invention of the present application has been made in view of the above points. One example of an object of the present invention is to provide a video distribution system, a video generation method, and a reproduction device that can reproduce a taken video while preventing deterioration of the quality of one or more sounds reproduced at the time of taking the video in a video sharing platform.

Solution to Problem

An aspect of the present invention is A video distribution system comprising: a video generation device configured to generate video information indicating a video, a reproduction device configured to reproduce the video; and a distribution apparatus, wherein the distribution apparatus includes: at least one memory configured to store sound distribution computer program code and video distribution computer program code; and at least one distribution processor configured to access the sound distribution computer program code and video distribution computer program code, and operate according to the sound distribution computer program code and video distribution computer program code, the sound distribution computer program code comprising: first sound information transmission code configured to cause at least one of the at least one distribution processor to transmit sound information indicating one or more sounds to the video generation device; timing information transmission code configured to cause at least one of the at least one distribution processor to transmit first timing information indicating one or more timings of reproducing the one or more sounds to the video generation device; and second sound information transmission code configured to cause at least one of the at least one distribution processor to transmit the sound information to the reproduction device, the video distribution computer program code comprising: video information reception code configured to cause at least one of the at least one distribution processor to receive the video information from the video generation device; and received video information transmission code configured to cause at least one of the at least one distribution processor to transmit the received video information to the reproduction device; the video generation device includes: at least one memory configured to store generation computer program code; and at least one generation processor configured to access the generation computer program code and operate according to the generation computer program code, the generation computer program code comprising: sound information reception code configured to cause at least one of the at least one generation processor to receive the sound information from the distribution apparatus; timing information reception code configured to cause at least one of the at least one generation processor to receive the first timing information from the distribution apparatus; video-taking control code configured to cause at least one of the at least one generation processor to cause a video-taking device to take the video; sound reproduction code configured to cause at least one of the at least one generation processor to reproduce, when the video being taken by the video-taking device, the one or more sounds indicated by the received sound information; timing identification code configured to cause at least one of the at least one generation processor to identify, when the one or more sounds being reproduced by the sound reproduction code, one or more timings of reproducing the one or more sounds indicated by the received sound information based on the received first timing information; and taken video information transmission code configured to cause at least one of the at least one generation processor to transmit the taken video to the distribution apparatus, and the reproduction device includes: at least one memory configured to store reproduction computer program code; and at least one reproduction processor configured to access the reproduction computer program code and operate according to the reproduction computer program code, the reproduction computer program code comprising: reproducible video information reception code configured to cause at least one of the at least one reproduction processor to receive the video information from the distribution apparatus; reproducible sound information reception code configured to cause at least one of the at least one reproduction processor to receive the sound information from the distribution apparatus; and video reproduction code configured to cause at least one of the at least one reproduction processor to reproduce the video indicated by the received video information and the one or more sounds indicated by the received sound information, and wherein the received video information transmission code is configured to cause at least one of the at least one distribution processor to transmit the video information including second timing information indicating the one or more timings of the reproduction identified by the timing identification code, and the video reproduction code is configured to cause at least one of the at least one reproduction processor to synchronize the video with the one or more sounds based on the second timing information included in the video information received by the reproducible video information reception code.

Another aspect of the present invention is a video generation method performable by a computer, the method comprising: receiving sound information indicating one or more sounds from a distribution apparatus configured to distribute the sound information; receiving first timing information indicating one or more timings of reproducing the one or more sounds from the distribution apparatus; causing a video-taking device to take the video; reproducing, when the video being taken by the video-taking device, the one or more sounds indicated by the received sound information; identifying, when the one or more sounds indicated by the received sound information being reproduced, the one or more timings of reproducing the one or more sounds indicated by the received sound information based on the received first timing information; and causing video information indicating the taken video to be generated, the video information including second timing information indicating the one or more identified timings.

Yet another aspect of the present invention is a reproduction device comprising: at least one memory configured to store computer program code; and at least one processor configured to access the computer program code and operate according to the computer program code, the computer program code comprising: video information reception code configured to cause at least one of the at least one processor to receive video information indicating a video, the video information generated according to control by a video generation device; sound information reception code configured to cause at least one of the at least one processor to receive sound information indicating one or more sounds; and video reproduction code configured to cause at least one of the at least one processor to reproduce the video indicated by the received video information and the one or more sounds indicated by the received sound information, wherein the video has been taken by a video-taking device, the video generation device is configured to reproduce the one or more sounds indicated by the sound information when the video being taken by the video-taking device, identify one or more timings of reproducing the one or more sounds when the one or more sounds being reproduced by the video generation device, and cause the video information including second timing information indicating the one or more identified timings to be generated, and the video reproduction code is configured to cause at least one of the at least one processor to synchronize the video with the one or more sounds based on the second timing information included in the received video information.

DETAILED DESCRIPTION

Hereinafter, embodiments of the present invention will be described in detail with reference to the drawings.

1. First Embodiment

[1-1. Configuration of Video Distribution System]

Figure 1:
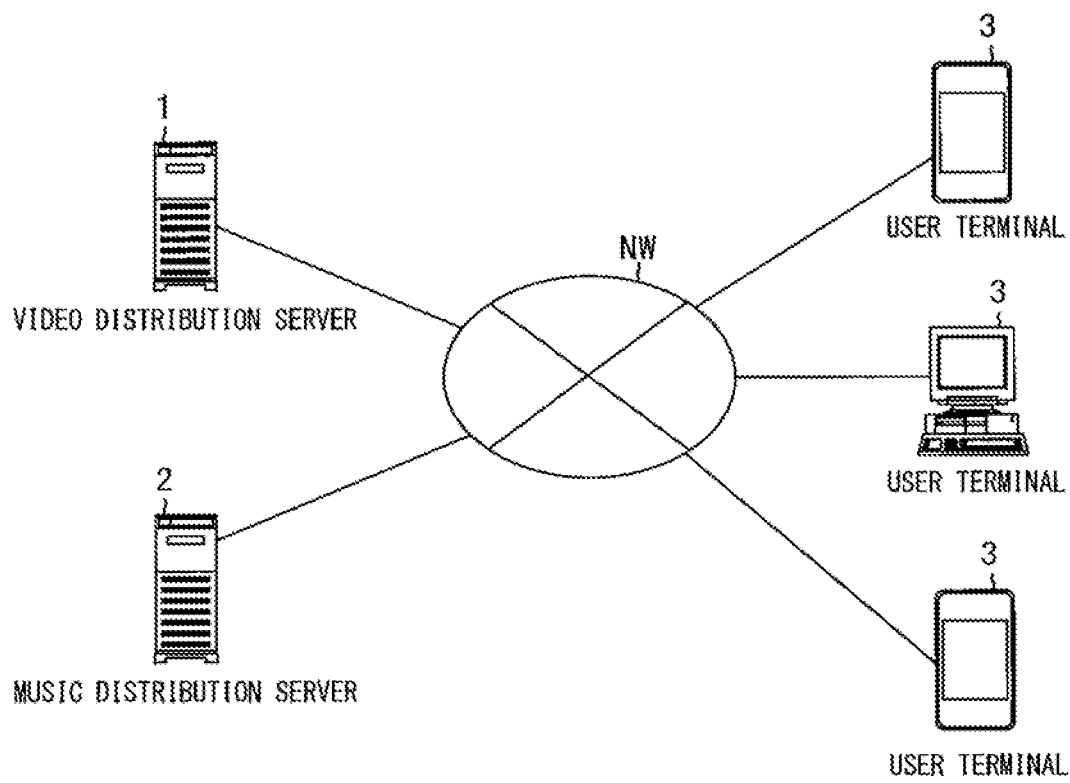
FIG. 1 is a diagram illustrating an example of an outline configuration of a video distribution system according to an embodiment.

First, the configuration and functional outline of a video distribution system S according to the present embodiment will be described with reference to FIGS. 1 and 2. FIG. 1 is a diagram illustrating an example of an outline configuration of the video distribution system S according to the present embodiment.

As illustrated in FIG. 1, the video distribution system S includes a video distribution server 1, a music distribution server 2, and a plurality of user terminals 3. The video distribution server 1, the music distribution server 2, and each of the user terminals 3 are connected to each other via a network NW. The network NW is constructed by, for example, the Internet, a dedicated communication line (for example, a community antenna television (CATV) line), a mobile communication network (including a base station and the like), and a gateway.

The video distribution server 1 is a server device that distributes a video taken by a user terminals 3 to another user terminals 3. Specifically, the video distribution server 1 distributes video information indicating a video by streaming. Examples of a video distribution mode include live distribution and on-demand distribution.

The music distribution server 2 is a server device that distributes one or more sounds to the user terminals 3.

Specifically, the music distribution server 2 distributes sound information indicating one or more sounds by streaming. In particular, the music distribution server 2 distributes sound information indicating a piece of music. Note that one or more sounds distributed from the music distribution server 2 is not limited to music. For example, the music distribution server 2 may distribute natural sounds or narrations. Note that the video distribution server 1 and the music distribution server 2 may be separate devices, or the music distribution server 2 may be integrated into the video distribution server 1.

Each of the user terminals 3 is a terminal device used by a user who can use the video distribution system S. Examples of the user terminals 3 include a mobile information terminal such as a smartphone or a tablet computer, a mobile phone, a personal digital assistant (PDA), a personal computer, and a set-top box. A user can use the video distribution system S by using a web browser or a dedicated application. For example, a user can create a video using any the user terminals 3 by taking a video. The user terminals 3 used for video creation is referred to as a video content creator terminal 3-1. The user terminals 3 can reproduce a video distributed from the video distribution server 1. The user terminals 3 that reproduces a video is referred to as a viewer terminal 3-2. The user terminals 3 can reproduce a piece of music distributed from the music distribution server 2.

Figure 2:
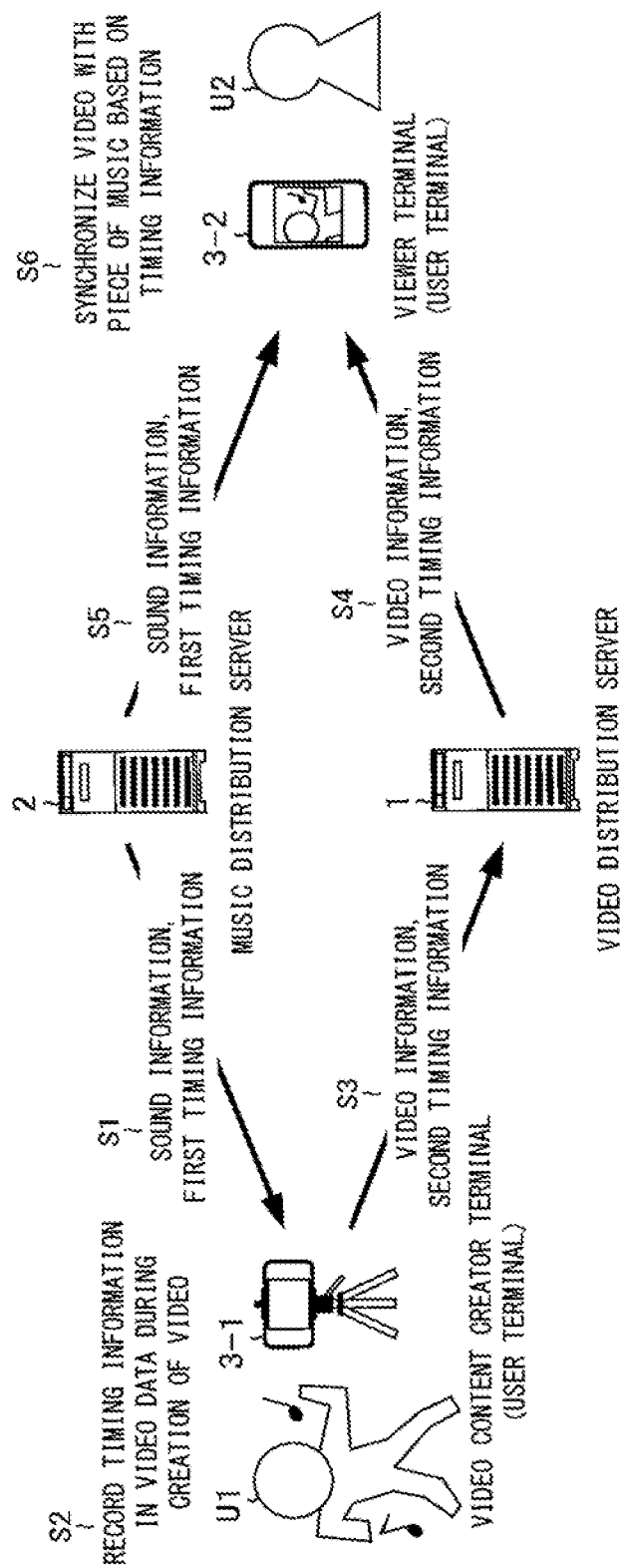
FIG. 2 is a diagram illustrating an example of a flow from creating a video to viewing the video.

FIG. 2 is a diagram illustrating an example of a flow from creating a video to viewing the video. In FIG. 2, a user U1 is a user who creates a video using the video content creator terminal 3-1. The user U2 is a user who views a video using the viewer terminal 3-2. The user U1 selects a piece of music to be reproduced. The user U1 starts taking a video by operating the video content creator terminal 3-1. In response to this, the music distribution server 2 distributes sound information of the selected piece of music and first timing information to the video content creator terminal 3-1 (step S1). The first timing information is information indicating one or more timings of reproducing one or more sounds as a piece of music. For example, the first timing information may be information indicating that they are one or more timings of reproducing one or more sounds. The video content creator terminal 3-1 takes a video and reproduces a piece of music according to the sound information distributed from the music distribution server 2. The video content creator terminal 3-1 generates video information indicating a taken video, and records the first timing information distributed from the music distribution server 2 in the video information as second timing information (step S2). The video content creator terminal 3-1 does not have to record a sound during taking a video. As a result, video information without sounds is generated. Alternatively, the user U1 may listen to a piece of music through a headphone or an earphone instead of the piece of music being output from speakers. In this case, the video content creator terminal 3-1 may record sounds. The video content creator terminal 3-1 uploads the generated video information including the second timing information to the video distribution server 1 (step S3).

The video distribution server 1 transmits the video information including the second timing information uploaded from the video content creator terminal 3-1 to the viewer terminal 3-2 (step S4). In parallel with this, the music distribution server 2 distributes sound information of a piece of music selected by the user U1 to the viewer terminal 3-2 (step S5). At this time, the music distribution server 2 may also transmit the first timing information to the viewer terminal 3-2. The viewer terminal 3-2 reproduces the piece of music according to the sound information distributed from the music distribution server 2 while reproducing the video according to the video information distributed from the video distribution server 1. At this time, the viewer terminal 3-2 synchronizes the video with the piece of music based on the second timing information included in the video information (step S6). In a case where the first timing information is also distributed from the music distribution server 2, the viewer terminal 3-2 may synchronize the video with the piece of music based on the first timing information and the second timing information.

While the above-described synchronization, while the video information itself does not include one or more sounds, the above-described synchronization makes it possible to reproduce the video and the piece of music at the same time as in a case of video information with sounds is used. The piece of music to be reproduced is not a piece of music recorded by the video content creator terminal 3-1 but a piece of music reproduced based on the original sound information. Therefore, deterioration of the sound quality of the piece of music is prevented.

[1-2. Configuration of Device]

[1-2-1. Configuration of Video Distribution Server]

Figure 3:
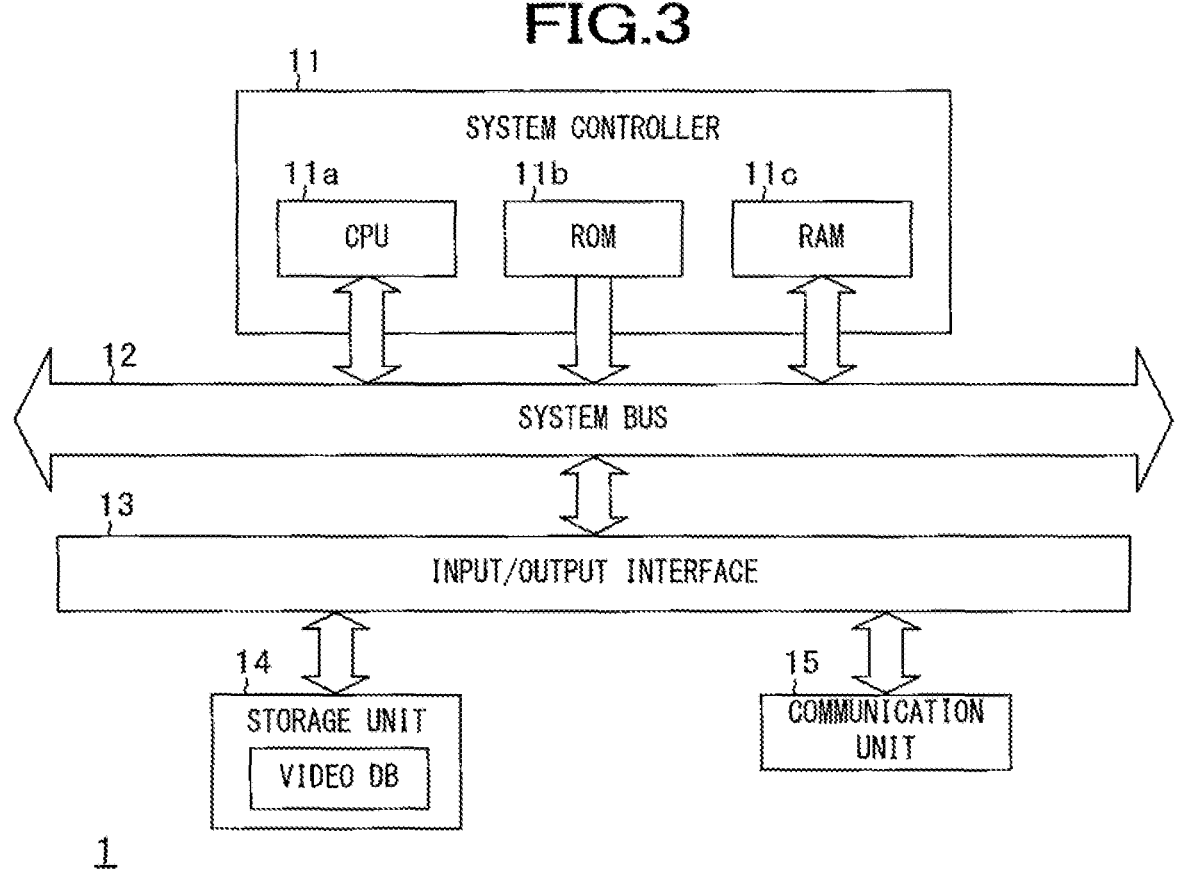
FIG. 3 is a block diagram illustrating an example of an outline configuration of a video distribution server according to an embodiment.

Next, the configuration of the video distribution server 1 will be described with reference to FIG. 3. FIG. 3 is a block diagram illustrating an example of an outline configuration of the video distribution server 1 according to the present embodiment. As illustrated in FIG. 3, the video distribution server 1 includes a system controller 11, a system bus 12, an input/output interface 13, and a communication unit 15. The system controller 11 and the input/output interface 13 are connected to each other via the system bus 12.

The system controller 11 includes a central processing unit (CPU) 11a, a read only memory (ROM) 11b, a random access memory (RAM) 11c, and the like.

The input/output interface 13 performs an interface process between a storage unit 14 and the communication unit 15, and the system controller 11.

The storage unit 14 includes, for example, a hard disk drive. The storage unit 14 may store, for example, video database (DB). The video DB stores video data as an example of video information generated by the video content creator terminal 3-1. For example, the video DB may store video data in association with a video ID and a musical piece ID. The video ID is identification information for identifying video data. The musical piece ID is identification information for identifying a piece of music. This musical piece T) indicates a piece of music reproduced by the video content creator terminal 3-1 at the time of taking a video. Examples of a format of a container of video data include MPEG2-TS, NP4, and f lash video (FLV). Examples of a format of a video include H.264 and MPEG-2. In a case where video data with sounds is used, examples of a format of the sounds include advanced audio coding (AAC) and MPEG-1 audio layer-3 (MP3). When an HTTP-based protocol is used for video distribution, one piece of video data may be divided into a plurality of segment files and stored in the video DB.

The storage unit 14 further stores various programs such as an operating system, a database management system (DBMS), and a video distribution server program. The video distribution server program is a program that causes the system controller 11 to execute various processes related to video distribution. The video distribution server program may be acquired from another device via the Internet NW, or may be recorded on a recording medium such as a magnetic tape, an optical disk, or a memory card and read via a drive device.

The communication unit 15 connects to the user terminals 3 via the network NW and controls a communication state with the user terminals 3.

[1-2-2. Configuration of Music Distribution Server]

Figure 4:
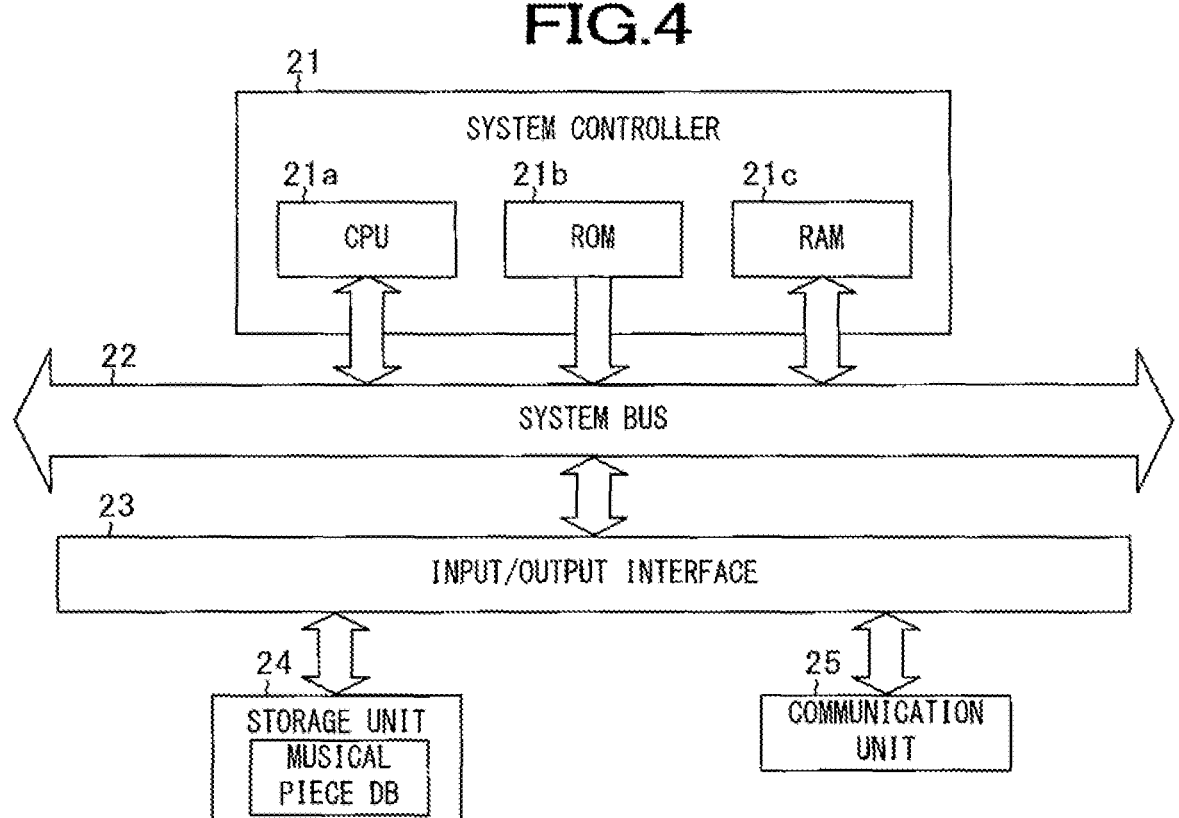
FIG. 4 is a block diagram illustrating an example of an outline configuration of a music distribution server according to an embodiment.

Next, the configuration of the music distribution server 2 will be described with reference to FIG. 4. FIG. 4 is a block diagram illustrating an example of an outline configuration of the music distribution server 2 according to the present embodiment. As illustrated in FIG. 4, the music distribution server 2 includes a system controller 21, a system bus 22, an input/output interface 23, a storage unit 24, and a communication unit 25. The system controller 21 and the input/output interface 23 are connected to each other via the system bus 22.

The system controller 21 includes a CPU 21a, a ROM 21b, a RAM 21c, and the like.

The input/output interface 23 performs an interface process between the storage unit 24 and the communication unit 25, and the system controller 21.

The storage unit 24 includes, for example, a hard disk drive. This storage unit 24 may store, for example, musical piece DB. The musical piece DB stores sound data as an example of sound information. For example, the musical piece DB may store sound data in association with a musical piece ID. The musical piece ID is identification information for identifying a piece of music. Examples of a format of sound data include AAC and MP3. Examples of a format of a container of sound data include MPEG2-TS, MP4, and FLV. When an HTTP-based protocol is used for music distribution, one piece of sound data may be divided into a plurality of segment files and stored in the musical piece DB.

The storage unit 24 further stores various programs such as an operating system, a DBMS, and a music distribution server program. The music distribution server program is a program that causes the system controller 21 to execute various processes related to musical piece distribution. For example, the music distribution server program may be acquired from another device via the Internet NW, or may be recorded on a recording medium such as a magnetic tape, an optical disk, or a memory card and read via a drive device.

The communication unit 25 connects to the user terminals 3 via the network NW and controls a communication state with the user terminals 3.

[1-2-3. Configuration of User Terminal]

Figure 5:
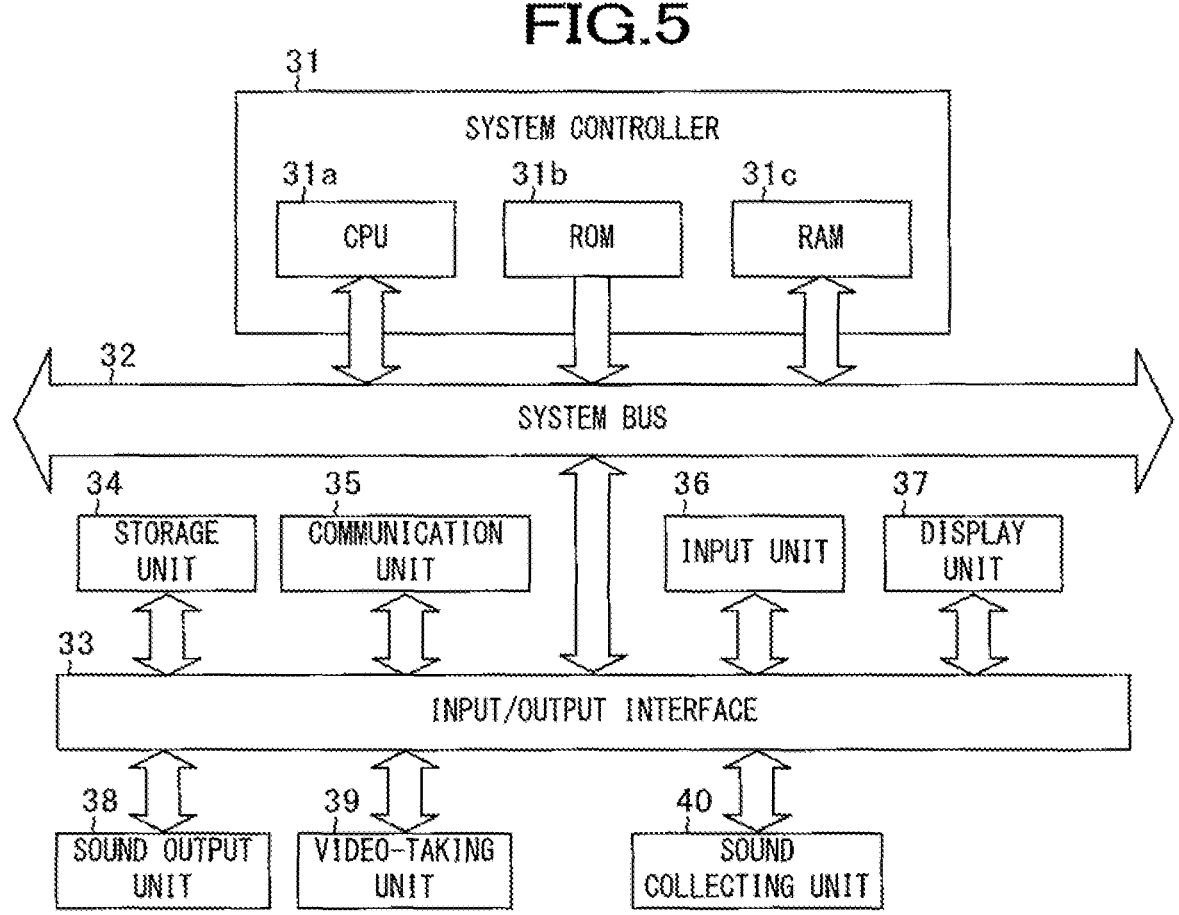
FIG. 5 is a block diagram illustrating an example of an outline configuration of a user terminal according to an embodiment.

Next, the configuration of each of the user terminals 3 will be described with reference to FIG. 5. FIG. 5 is a block diagram illustrating an example of an outline configuration of each of the user terminals 3 according to the present embodiment. As illustrated in FIG. 5, each of the user terminals 3 includes, for example, a system controller 31, a system bus 32, an input/output interface 33, a storage unit 34, a communication unit 35, an input unit 36, a display unit 37, a sound output unit 38, a video-taking unit 39, and a sound collecting unit 40. The system controller 31 and the input/output interface 33 are connected to each other via the system bus 32. Note that at least one of the input unit 36, the display unit 37, the sound output unit 38, the video-taking unit 39, and the sound collecting unit 40 may be connected to the user terminals 3 via wire or wireless instead of being included in the user terminals 3 themselves.

The system controller 31 includes a CPU 31a, a ROM 31b, a RAM 31c, and the like.

The input/output interface 33 performs an interface process between the storage unit 34 to the sound collecting unit 40, and the system controller 31.

The storage unit 34 includes, for example, a flash memory or a hard disk drive. This storage unit 34 stores various programs such as an operating system and a browser. The storage unit 34 may further store a dedicated application for using the video distribution system S. According to the dedicated application, the system controller 31 executes a process related to creation and reproduction of a video. For example, the dedicated application may be acquired from a server device such as the video distribution server 1 via the network NW, or may be recorded on a recording medium such as an optical disk or a memory card and read via a drive device. Note that a web application or the like via a browser may implement functions equivalent to some or all of the functions of the dedicated application.

The communication unit 35 includes, for example, a network interface card. The communication unit 35 connects to the video distribution server 1 or the music distribution server 2 via the network NW, and controls a communication state with these devices.

The input unit 36 includes, for example, a touch panel, a mouse, or a keyboard. The input unit 36 accepts an operation or an input to a user, and transmits a signal indicating the accepted operation or input to the system controller 31.

The display unit 37 includes, for example, a liquid crystal panel or an organic electro luminescence (EL) panel. The display unit 37 displays information such as a character, a still image, or a video based on control by the system controller 31.

The sound output unit 38 includes, for example, an amplifier or a speaker. The sound output unit 38 may further include an earphone jack for connecting an earphone or a headphone to the user terminals 3. The sound output unit 38 outputs a sound wave corresponding to a sound signal transmitted from the system controller 31 or the like.

The video-taking unit 39 includes a digital camera or the like. The video-taking unit 39 takes a video based on an operation by a user. The video-taking unit 39 outputs video data indicating the taken video to the system controller 31 or the storage unit 34. Examples of a format of the output video data include H.264 and MPEG-2.

The sound collecting unit 40 includes a microphone or the like. The sound collecting unit 40 converts at least one emitted sound into at least one input sound, and outputs this input sound signal to the system controller 31 or the storage unit 34.

[1-3. Functional Outline of Device]

[1-3-1. Music Distribution Server]

Figure 6:
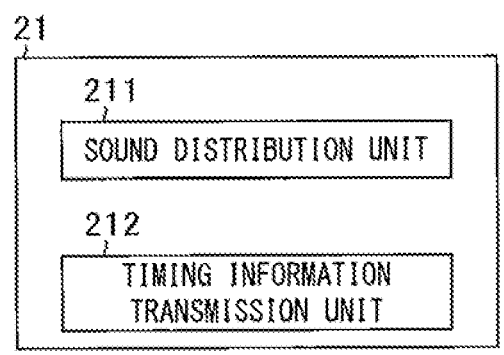
FIG. 6 is a diagram illustrating an example of a functional block of a system controller in a music distribution server according to an embodiment.

Next, a functional outline of the system controller 21 in the music distribution server 2 will, be described with reference to FIG. 6. FIG. 6 is a diagram illustrating an example of a functional block of the system controller 21 in the music distribution server 2 according to the present embodiment. The CPU 21a reads and executes various program codes included in the music distribution server program, and the system controller 21 thereby functions as a sound distribution unit 211, a timing information transmission unit 212, and the like as illustrated in FIG. 6.

The sound distribution unit 211 transmits sound data to the video content creator terminal 3-1. Examples of a protocol of sound distribution include HTTP live streaming (HLS), dynamic adaptive streaming over HTTP (MPEG-DASH), and real time messaging protocol (RTMP). Specifically, the sound distribution unit 211 may sequentially transmit a plurality of sound fragments corresponding to a plurality of respective portions constituting a piece of music as an example of one or more sounds and having different reproduction timings to the video content creator terminal 3-1. The sound fragment is data indicating a waveform of a sound having a certain length of time. Time lengths of all the sound fragments may be the same as each other, or time lengths of at least some of the sound fragments may be different from each other. Examples of the sound fragments include a packetized elementary stream (PES) and a chunk. Each of the sound fragments may include header information. The header information may include identification information for identifying the sound fragment. This information may be, for example, a time stamp (for example, presentation time stamp (PTS). The time stamp may indicate a time elapsed from start of reproduction of a piece of music to reproduction of a sound indicated by the sound fragment. When an HTTP-based protocol such as HLS or MPEG-DASH is used, the sound distribution unit 211 may sequentially transmit a plurality of segment files each including a plurality of sound fragments.

The sound distribution unit 211 transmits sound data to the viewer terminal 3-2 in the same way.

The timing information transmission unit 212 transmits the first timing information indicating one or more timings of reproducing one or more sounds indicated by the sound data transmitted by the sound distribution unit 211 to the video content creator terminal 3-1. The first timing information may include a time elapsed from start of reproduction of a piece of music to reproduction of a sound indicated by any of sound fragments included in the sound data transmitted by the sound distribution unit 211. This time may be a time stamp included in the sound fragment. The first timing information may include identification information of the sound fragment. As a result, the first timing information is associated with the sound fragment. This identification information may be the time stamp. In this case, the first timing information Indicates a time elapsed from start of reproduction of the piece of music to a time when the sound indicated by the sound fragment associated with the first timing information is reproduced.

The timing information transmission unit 212 may transmit only one piece of the first timing information when distributing one piece of sound data. For example, when the sound distribution unit 211 transmits a sound fragment at the beginning among a plurality of sound fragments constituting sound data, the first timing information transmission unit 212 may transmit the first timing information in association with the sound fragment.

The timing information transmission unit 212 may transmit a plurality of pieces of the first timing information when distributing one piece of sound data. In this case, the timing information transmission unit 212 may transmit the first timing information indicating a timing of reproducing each of the plurality of sound fragments included in the sound data. That is, each piece of the first timing information is associated with any one of the sound fragments. One sound fragment may be associated with one piece of the first timing information, or a plurality of successive sound fragments may be associated with one piece of the first timing information. In the latter case, the first timing information may indicate the same identification information as the identification information of a sound fragment at the beginning among the successive sound fragments.

The timing information transmission unit 212 may transmit the first timing information as, for example, ID3 timed metadata. For example, the timing information transmission unit 212 may transmit the first timing information as a fragment of the ID3 timed metadata. When an HTTP-based protocol is used, for example, the first timing information may be inserted in a segment file in advance.

The timing information transmission unit 212 transmits the first timing information to the viewer terminal 3-2 in the same way.

[1-3-2. Video Content Creator Terminal]

Figure 7:
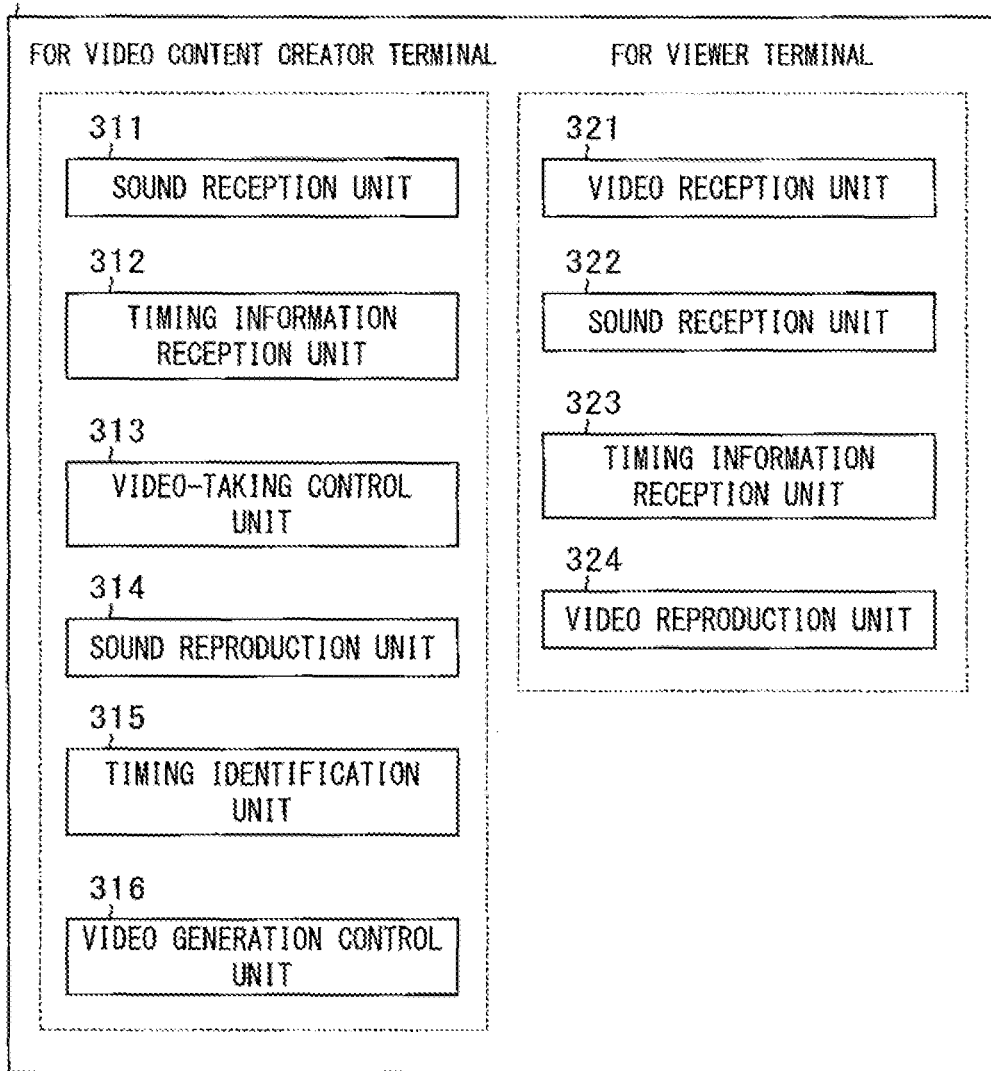
FIG. 7 is a diagram illustrating an example of a functional block of a system controller in a user terminal according to an embodiment.

Next, a functional outline of the system controller 31 in the video content creator terminal 3-1 will be described with reference to FIGS. 7 and 8. FIG. 7 is a diagram illustrating an example of a functional block of the system controller 31 in the user terminals 3 according to the present embodiment. The CPU 31a reads and executes various program codes included in the dedicated application, and the system controller 31 thereby functions as a sound reception unit 311, a timing information reception unit 312, a video-taking control unit 313, a sound reproduction unit 314, a timing identification unit 315, a video generation control unit 316, and the like as illustrated in FIG. 7.

The sound reception unit 311 receives sound data transmitted by the sound distribution unit 211 of the music distribution server 2. For example, the sound reception unit 311 may receive a sound stream including a plurality of sound fragments, or may sequentially receive a plurality of segment files.

The timing information reception unit 312 receives the first timing information transmitted by the timing information transmission unit 212 of the music distribution server 2. For example, the timing information reception unit 312 may receive the first timing information indicating timings of reproducing of the plurality of respective sound fragments constituting the sound data.

The video-taking control unit 313 causes the video-taking unit 39 to take a video. The video-taking control unit 313 controls start and stop of taking a video by the video-taking unit 39. The video-taking control unit 313 receives video data indicating a video taken by the video-taking unit 39 from the video-taking unit 39. For example, the video-taking unit 39 receives data of each frame image constituting a video. The frame image data may include, for example, header information. This header information may include identification information for identifying the frame image data. This identification information may be a time stamp. This time stamp may indicate a time elapsed from start of taking a video to a time when the frame image is taken.

When the video is being taken by the video-taking control unit 313, the sound reproduction unit 314 reproduces one or more sounds indicated by sound data received from the music distribution server 2. For example, the sound reproduction unit 314 decodes sound fragments sequentially transmitted from the video-taking control unit 313 to obtain data of waveforms of one or more sounds. The sound reproduction unit 314 outputs data of each waveform to the sound output unit 38. The sound output unit 38 converts the data of the waveform into analog sound signal, amplifies the sound signal, and cause the speakers or the headphone to output a sound wave corresponding to the amplified sound signal from. The sound reproduction unit 314 may start reproduction of one or more sounds at the same time as start of taking the video by the video-taking unit 39. The sound reproduction unit 314 may start reproduction of one or more sounds before start of taking the video or during taking the video based on instructions from a user.

When one or more sounds indicated by the sound data are being reproduced by the sound reception unit 311, the timing identification unit 315 identifies one or more timings of reproducing the one or more sounds indicated by the sound data based on the first timing information received by the timing information reception unit 312. For example, the timing identification unit 315 may identify a sound fragment having the same identification information as identification information (for example, a time stamp) indicated by the first timing information among sound fragments received by the sound reception unit 311. The timing identification unit 315 identifies frame image data received from the video-taking unit 39 by the video-taking control unit 313 when the identified sound fragment is played back. The timing identification unit 315 acquires, from the identified frame image data, identification information (for example, a time stamp) of the frame image data.

The video generation control unit 316 causes video information indicating a video taken by the video-taking unit 39 and including the second timing information indicating a reproduction timing identified by the timing identification unit 315 to be generated. For example, the video generation control unit 316 may sequentially transmit frame image data received from the video-taking control unit 313 to the video distribution server 1 by a video transmission unit 317. The video generation control unit 316 may generate the first timing information received by the timing information reception unit 312 and the second timing information including identification information of a frame image identified by the timing identification unit 315 for the first timing information. As a result, the sound fragment is associated with the frame image data. In this case, the second timing information indicates that a sound indicated by the sound fragment associated with the first timing information is reproduced when the frame image indicated by the identification information is displayed. A plurality of successive sound fragments may be associated with one frame image when a display duration of the one frame image (a reciprocal of a frame rate) is longer than a time length of each of the sound fragments. A plurality of successive frame images may be associated with one sound fragment when a display duration of one frame image is shorter than a time length of each of the sound fragments. The video generation control unit 316 may transmit the generated second timing information to the video distribution server 1. As a result, the video generation control unit 316 causes the video distribution server 1 to generate video data including the second timing information. The video generation control unit 316 may transmit, for example, a request for inserting the second timing information into video data or a stream of the video data as ID3 timed metadata to the video distribution server 1. This request for insertion includes a timecode and a value. The time cod is set to a time elapsed from start of taking a video (for example, a time stamp of a frame image). The value is set to the first timing information.

The video generation control unit 316 itself may generate video data. For example, the video generation control unit 316 may generate video data or a segment file including the frame image data received from the video-taking unit 39 and the second timing information. The video generation control unit 316 may transmit the generated video data or segment file to the video distribution server 1.

Figure 8:
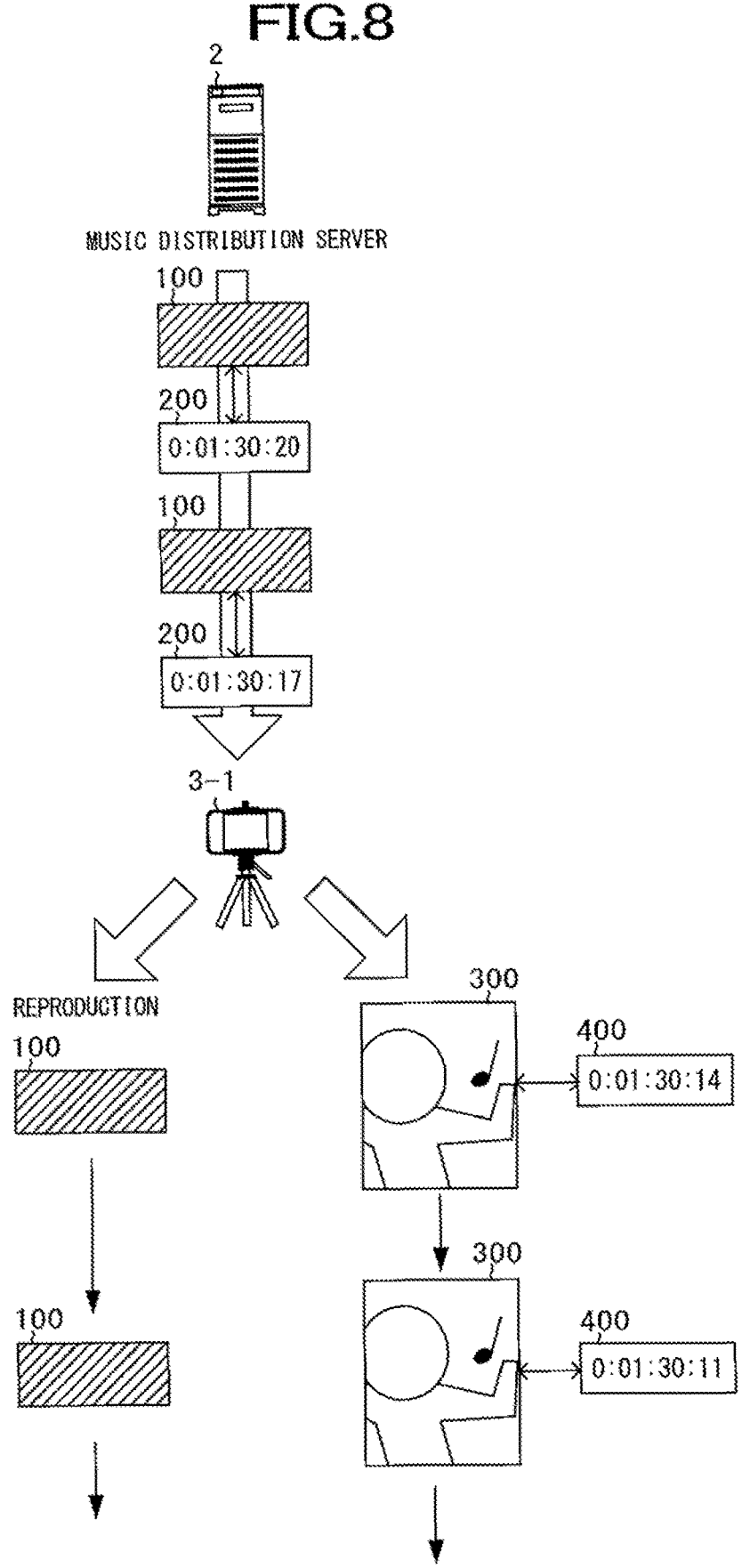
FIG. 8 is a diagram illustrating an example of an outline of video creation.

FIG. 8 is a diagram illustrating an example of an outline of video creation. For convenience of description, it is assumed that sound data is divided into sound fragments each corresponding to 30 milliseconds, and a display duration of one frame image is 30 milliseconds. As illustrated in FIG. 8, the music distribution server 2 sequentially transmits sound fragments 100 to the video content creator terminal 3-1 and also transmits first timing information 200 associated with each of the sound fragments 100. The sound fragment 100 and the first timing information 200 associated with each other may be successively transmitted, or do not have to be successive. A difference between timings indicated by any two successive pieces of the first timing information 200 is 30 milliseconds. The video content creator terminal 3-1 reproduces a sound based on the received sound fragment 100. The video content creator terminal 3-1 sequentially receives frame image data 300 from the video-taking unit 39. Each time the video content creator terminal 3-1 receives the frame image data 300, the video content creator terminal 3-1 generates second timing information 400 including the first timing information 200 associated with the sound fragment 100 played back at that time, and associates this second timing information 400 with this frame image data 300. The video content creator terminal 3-1 transmits, for example, sequentially the frame image data 300 and the second timing information 400 to the video distribution server 1.

[1-3-3. Video Distribution Server]

Figure 9:
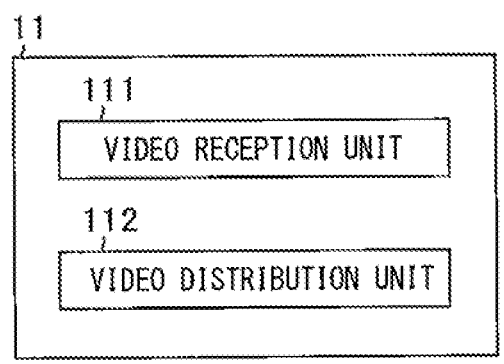
FIG. 9 is a diagram illustrating an example of a functional block of a system controller in a video distribution server according to an embodiment.

Next, a functional outline of the system controller 11 in the video distribution server 1 will be described with reference to FIG. 9. FIG. 9 is a diagram illustrating an example of a functional block of the system controller 11 in the video distribution server 1 according to the present embodiment. The CPU 11*a* reads and executes various program codes included in the video distribution server program, and the system controller 11 thereby functions as a video reception unit 111, a video distribution unit 112, and the like as illustrated in FIG. 9.

The video reception unit 111 receives video information and second timing information from the video content creator terminal 3-1. For example, the video reception unit 111 may sequentially receive frame image data as a video stream. In addition, the video reception unit 111 may receive second timing information sequentially transmitted from the video content creator terminal 3-1. Then, the video reception unit 111 may generate video data or a segment file including a plurality of pieces of frame image data and a plurality of pieces of second timing information. Alternatively, the video reception unit 111 may receive video data or a segment file generated by the video content creator terminal 3-1 and including the second timing information.

The video distribution unit 112 transmits video information received by the video reception unit 111 and including the second timing information received by the video reception unit 111 to the viewer terminal 3-2. For example, the video distribution unit 112 may transmit a video stream including the frame image data and the second timing information, or may sequentially transmit a plurality of segment files each including the second timing information.

[1-3-4. Viewer Terminal]

Next, a functional outline of the system controller 31 in the viewer terminal 3-2 will be described with reference to FIGS. 7 and 10. The CPU 31*a* reads and executes various program codes included in the dedicated application, and the system controller 31 thereby functions as a video reception unit 321, a sound reception unit 322, a timing information reception unit 323, a video reproduction unit 324, and the like as illustrated in FIG. 7.

The video reception unit 321 receives the video information generated by control by the video content creator terminal 3-1 from the video distribution server 1. For example, the video reception unit 321 may receive the video stream including the plurality of pieces of frame image data from the video distribution unit 112 of the video distribution server 1, or may sequentially receive the plurality of segment files.

The sound reception unit 322 receives the sound information from the music distribution server 2. Specifically, the sound reception unit 322 receives the sound information indicating one or more sounds reproduced at the time of taking the video by the sound reproduction unit 314 of the video content creator terminal 3-1 used for creating the video data received by the video reception unit 321. The sound reception unit 311 may receive the sound stream including the plurality of sound fragments, or may sequentially receive the plurality of segment files.

The timing information reception unit 312 receives the first timing information indicating the one or more timings of reproducing the one or more sounds indicated by the sound information received by the sound reception unit 322 from the music distribution server 2. For example, the timing information reception unit 312 may receive the first timing information included in the sound stream from the music distribution server 2, or, as the sound reception unit 322, may receive the segment file including the second timing information.

The video reproduction unit 324 reproduces the video indicated by the video information received by the video reception unit 321 and the one or more sounds indicated by the sound information received by the sound reception unit 322. At this time, the video reproduction unit 324 synchronizes the video with the one or more sounds based on the second timing information included in the video information received by the video reception unit 321. The video reproduction unit 324 may synchronize the video with the one or more sounds based on the second timing information and the first timing information received by the timing information reception unit 312. For example, the video reproduction unit 324 sequentially reads frame image data from the received video stream or video segment file. The video reproduction unit 324 decodes the frame image data and display a frame image on the display unit 37. In addition, the video reproduction unit 324 sequentially reads sound fragments from the received sound stream or musical piece segment file. The video reproduction unit 324 decodes the sound fragments and causes the sound output unit 38 to output one or more sounds. For example, when the video reproduction unit 324 reads second timing information from the video stream or the video segment file, the video reproduction unit 324 may identify frame image data including the same identification information as identification information included in the second timing information. The video reproduction unit 324 may acquire first timing information from the read second timing information. The video reproduction unit 324 may identify the same first timing information as the acquired first timing information from the sound stream or the segment file of the piece of music. The video reproduction unit 324 may identify a sound fragment associated with the identified first timing information. The video reproduction unit 324 may perform reproduction processes of the frame image data and the sound fragment identified in this way at the same time.

Figure 10:
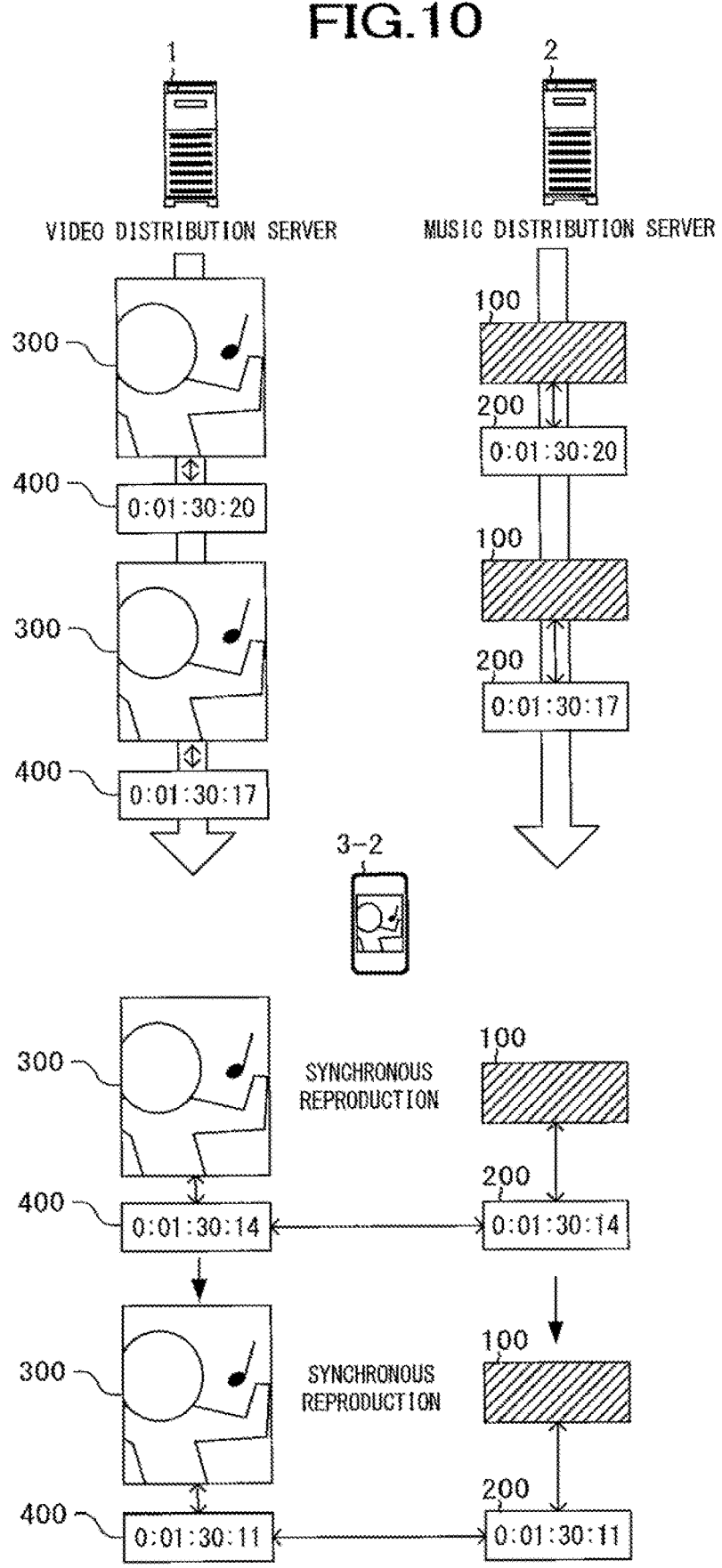
FIG. 10 is a diagram illustrating an example of an outline of video reproduction.

FIG. 10 is a diagram illustrating an example of an outline of video reproduction. As illustrated in FIG. 10, the video distribution server 1 sequentially transmits the frame image data 300 and the second timing information 400 included in video data to the viewer terminal 3-2. The frame image data 300 and the second timing information 400 associated with each other by a time stamp may be successively transmitted, or do not have to be successive. In parallel with this, the music distribution server 2 sequentially transmits the sound fragment 100 and the first timing information 200 to the viewer terminal 3-2. The viewer terminal 3-2 that has received the sound fragment 100, the first timing information 200, the frame image data 300, and the second timing information 400 refers to the first timing information 200 and the second timing information 400 and identifies the sound fragment 100 and the frame image data 300 on which the first timing information 200 is the same as the second timing information 400. The viewer terminal 3-2 reproduces a video and a sound using the identified sound fragment 100 and frame image data 300, and synchronizes the video with the sound.

When a video is reproduced based on video information and sound information not recorded in this video information, the video can be appropriately synchronized with the one or more sounds by using the timing information. For example, as a comparative example with respect to the method of the present embodiment, it is conceivable to cause a timing of reproducing a head portion of a video to coincide with a timing of reproducing a head portion of a piece of music. However, in the case of this comparative example, the reproduction timings may not match as the reproduction progresses. In addition, it is difficult to implement appropriate synchronization when reproduction control based on a user operation such as pause of reproduction, fast forward or rewind of a video is performed. Meanwhile, according to the method of the present embodiment, synchronization is performed in units of one or more frame images and one or more sound fragments, and therefore appropriate synchronization is possible even when a reproduction time is longer. In addition, appropriate synchronization is possible even when reproduction control such as pause, fast forward, or rewind is performed. Furthermore, appropriate synchronization is possible even when reproduction of the piece of music is started before or after start of taking the video.

By utilizing the above-described features, only a part of a piece of music can be reproduced during reproduction of the video. For example, a part of a reproduction period from the beginning to the end of a piece of music is set in advance. When displaying a frame image, the video reproduction unit 324 may reproduce a sound only when a timing indicated by the first timing information included in the second timing information associated with the frame image is included in the set period. For example, for a user having a high member rank or a user who has paid a fee for the piece of music to be reproduced, the video reproduction unit 324 may reproduce the entire piece of music. On the other hand, for a user having a low member rank or a user who has not paid the fee for the piece of music to be reproduced, the video reproduction unit 324 may reproduce only a part of the piece of music.

The music distribution server 2 may not transmit the first timing information to the viewer terminal 3-2. In this case, the video reproduction unit 324 may synchronize the video with sounds based on the second timing information. For example, when the sound fragment includes a time stamp, the video reproduction unit 324 may use this time stamp in place of the first timing information.

[1-4. Operation of Video Distribution System]

Next, an operation of each of the user terminals 3 in the video distribution system S will be described with reference to FIGS. 11 to 13. The system controller 31 of each of the user terminals 3 executes the processes illustrated in FIGS. 11 to 13 according to programs code included in the dedicated application.

Figure 11:
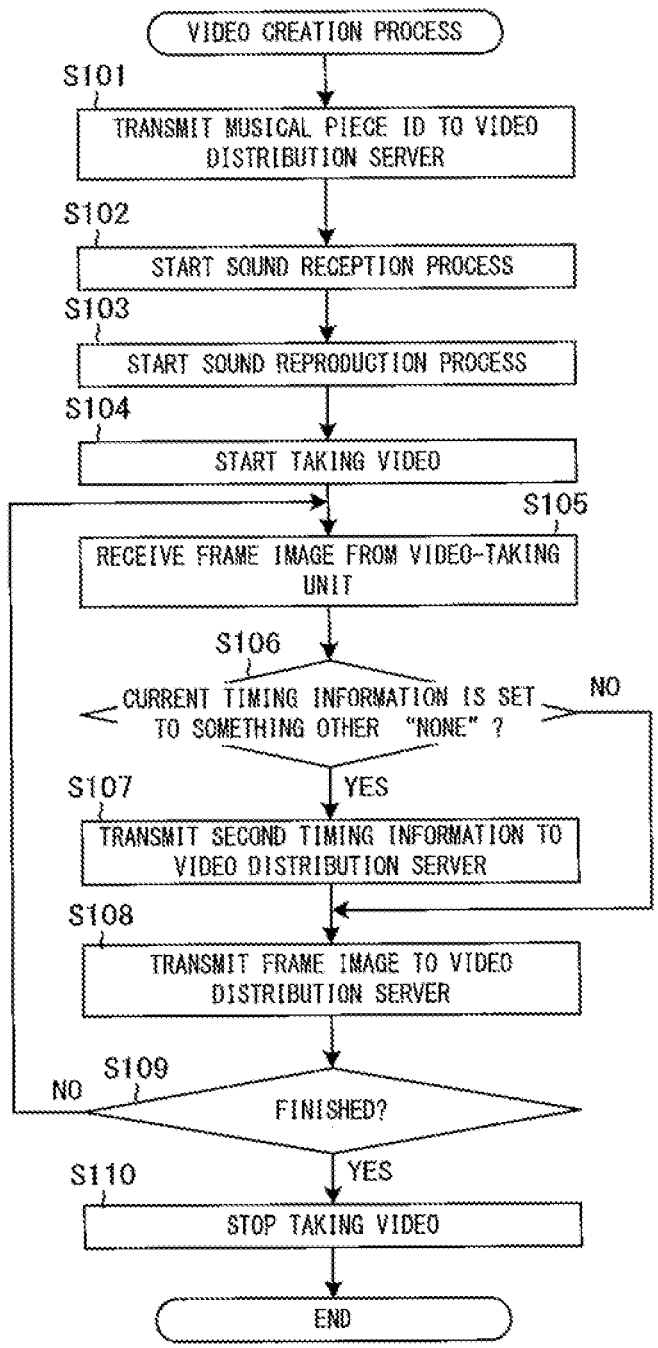
FIG. 11 is a flowchart illustrating an example of a video creation process by a system controller of a video content creator terminal.

FIG. 11 is a flowchart illustrating an example of a video creation process by the system controller 31 of the video content creator terminal 3-1. For example, the user U1 selects a piece of music to be reproduced by operating the video content creator terminal. 3-1 and gives instructions to start taking a video. In response to this, the system controller 31 executes a video creation process. As illustrated in FIG. 11, the video generation control unit 316 transmits a musical piece ID of the piece of music selected by the user U1 to the video distribution server 1 (step S101). In response to this, the video distribution server 1 generates a new video ID. The video distribution server 1 stores video data subsequently transmitted from the video content creator terminal 3-1 in the video DB in association with the musical piece ID and the video ID. After transmitting the musical piece ID, the system controller 31 starts a sound reception process (step S102) and starts a sound reproduction process (step S103). The video creation process, the sound reception process, and the sound reproduction process are performed simultaneously.

In the sound reception process, the sound reception unit 311 transmits, for example, the musical piece ID of the piece of music selected by the user U1 to the music distribution server 2, and thereby receives a playlist of segment files of the piece of music from the music distribution server 2. Then, the sound reception unit 311 sets a sequence number of a segment file of the piece of music to 1. Subsequently, the sound reception unit 311 and the timing information reception unit 312 receive the segment file indicated by the sequence number from the music distribution server 2 and store the segment file in the storage unit 34. The sound reception unit 311 sequentially receives segment files while increasing the sequence number.

Figure 12:
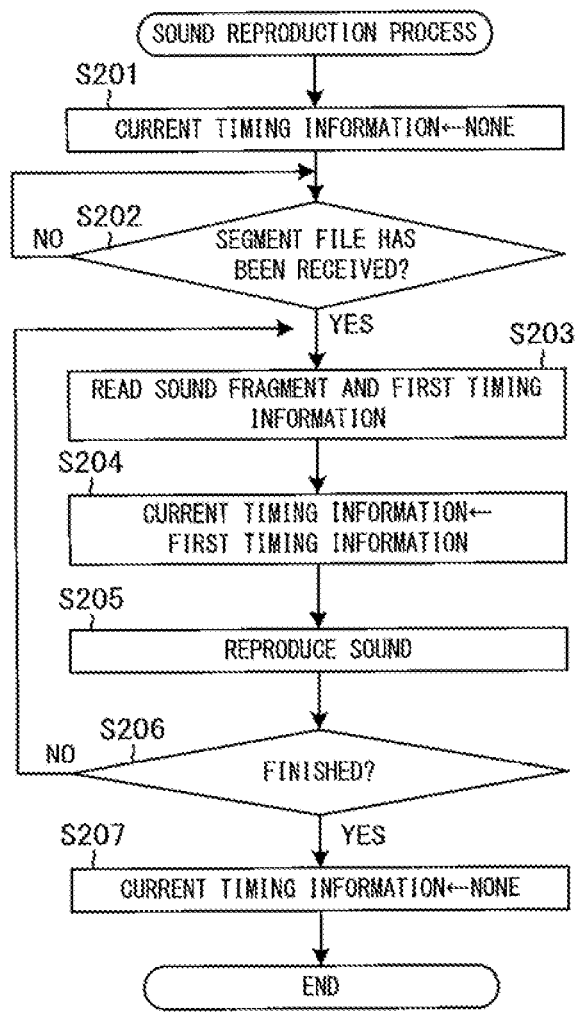
FIG. 12 is a flowchart illustrating an example of a sound reproduction process by a system controller of a video content creator terminal.

FIG. 12 is a flowchart illustrating an example of a sound reproduction process by the system controller 31 of the video content creator terminal 3-1. As illustrated in FIG. 12, the timing identification unit 315 sets current timing information to "none" (step S201). Subsequently, the sound reproduction unit 314 determines whether or not any segment file has been received in the sound reception process (step S202). When any segment file has not been received (step S202: NO), the determination in step S202 is executed again. On the other hand, when any segment file has been received (step S202: YES), the sound reproduction unit 314 reads a sound fragment from the segment file stored in the storage unit 34, and the timing identification unit 315 reads first timing information associated with the sound fragment (step S203). Subsequently, the timing identification unit 315 sets the current timing information to the read first timing information (step S204). Subsequently, the sound reproduction unit 314 reproduces a sound based on the read sound fragment (step S205). Subsequently, the sound reproduction unit 314 determines whether or not sound reproduction of an end portion of the piece of music has been finished (step S206). When the sound reproduction of the end portion has not been finished (step S206: NO), the process proceeds to step S203. On the other hand, when the sound reproduction of the end portion has been finished (step S206: YKS), the sound reproduction unit 314 sets the current timing information to "none" (step S207). Then, the sound reproduction process is finished.

In FIG. 11, after start of the sound reception process and the sound reproduction process, the video-taking control unit 313 causes the video-taking unit 39 to start taking a video (step S104). Subsequently, the video-taking control unit 313 receives frame image data from the video-taking unit 39 (step S105). Subsequently, the timing identification unit 315 determines whether or not the current timing information is set to something other than "none" (step S106). When the current timing information is set to something other than "none" (step S106: YES), the video generation control unit 316 transmits second timing information including the current timing information to the video distribution server 1 in association with the received frame image data (step S107). After step S107 or when the current timing information is set to "none" (step S106: NO), the video generation control unit 316 transmits the frame image data received from the video-taking unit 39 to the video distribution server 1 (step S108). Subsequently, the video generation control unit 316 determines whether or not the user U1 has given instructions to finish taking the video based on a signal from the input unit 36 (step S109). When the user U1 has not given the instructions to finish taking the video (step S109: NO), the process proceeds to step S105. On the other hand, when the user U1 has given the instructions to finish taking the video (step S109: YES), the video-taking control unit 313 causes the video-taking unit 39 to stop taking the video (step S110), and the video creation process is finished.

Figure 13:
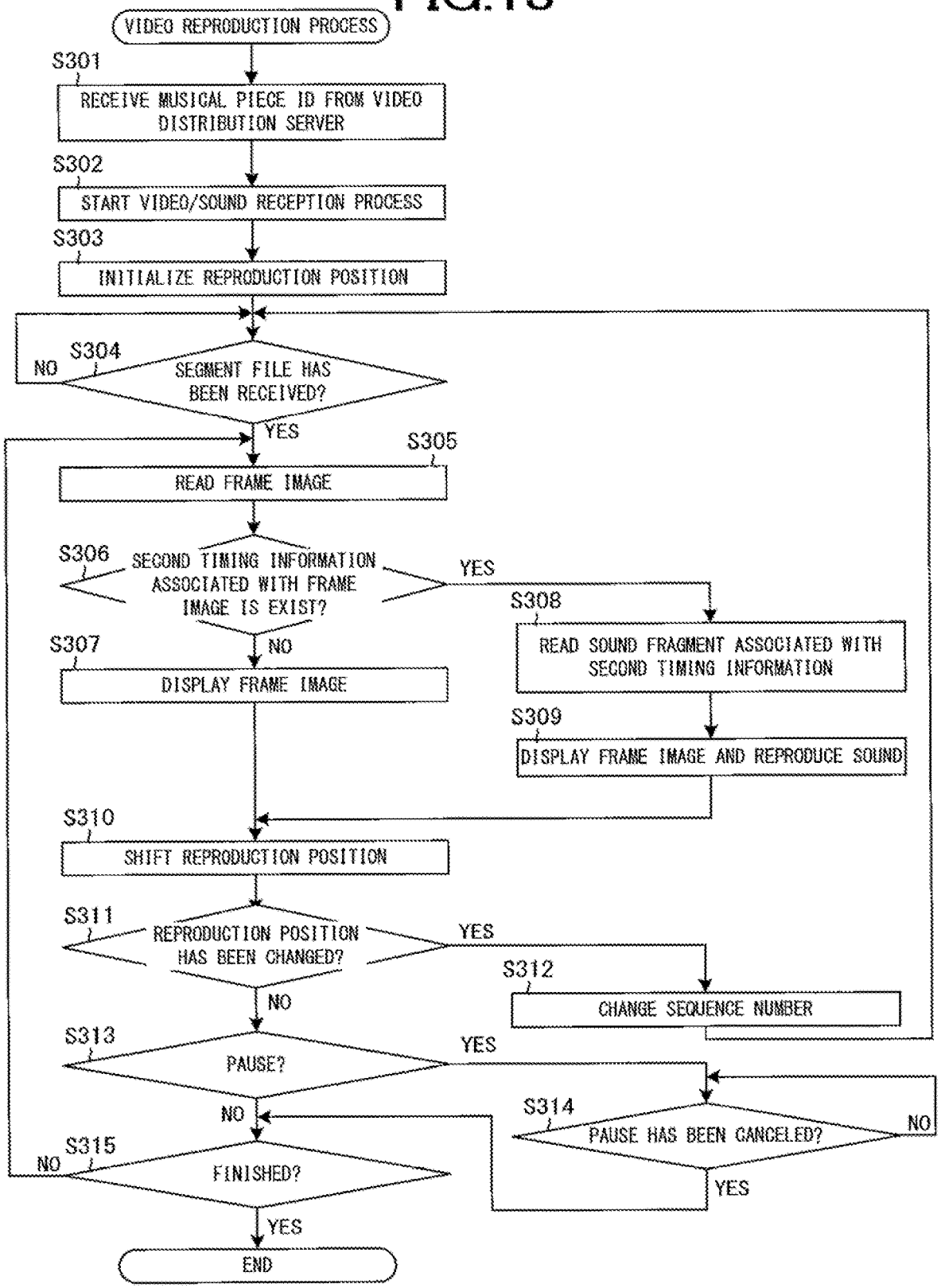
FIG. 13 is a flowchart illustrating an example of a video reproduction process by a system controller of a viewer terminal.

FIG. 13 is a flowchart illustrating an example of a video reproduction process by the system controller 31 of the viewer terminal 3-2. For example, the user U2 operates the viewer terminal 3-2 and selects a video registered in the video distribution system S or a video currently being live-distributed. In response to this, the system controller 31 executes a video reproduction process. As illustrated in FIG. 13, the video reproduction unit 324 transmits a video ID of the video selected by the user U2 to the video distribution server 1, and thereby receives a musical piece ID stored in the video DB in association with the video ID (step S301). Subsequently, the system controller 31 starts a video/sound reception process (step S302). The video reproduction process and the video/sound reception process are performed simultaneously.

In the video/sound reception process, the video reception unit 321 transmits the musical piece ID to the music distribution server 2, and thereby receives a playlist of segment files of a piece of music from the music distribution server 2. The video reception unit 321 transmits the video ID of the video selected by the user U1 to the video distribution server 1, and thereby receives a playlist of segment files of the video from the video distribution server 1. The video reception unit 321 initializes a sequence number of a video segment file. In a case of on-demand distribution, the video reception unit 321 may set the sequence number to 1. In a case of live distribution, the video reception unit 321 may set the sequence number to a number of the latest segment file. Then, the video reception unit 321 receives the video segment file indicated by the sequence number from the video distribution server 1 and store the segment file in the storage unit 34. The video reception unit 321 sequentially receives video segment files at predetermined time intervals while increasing the sequence number. When any of the video segment files includes second timing information, the sound reception unit 322 obtains a sequence number of a corresponding segment file of the piece of music. The corresponding segment file corresponds to the obtained second timing information. The sound reception unit 322 receives the segment files of the piece of music indicated by the sequence number from the music distribution server 2 and store the segment file in the storage unit 34. The sound reception unit 322 sequentially receives segment files of the piece of music at predetermined time intervals while increasing the sequence number.

After start of the video/sound reception process, the video reproduction unit 324 initializes a reproduction position of the video (step S303). For example, in a case of on-demand distribution, the video reproduction unit 324 may set the reproduction position to 0. In a case of live distribution, the video reproduction unit 324 may set the reproduction position according to a time elapsed from distribution start of the video.

Subsequently, the video reproduction unit 324 determines whether or not any video segment file has been received in the video/sound reception process (step S304). When any segment file has not been received (step S304: NO), the determination in step S304 is executed again. On the other hand, when any segment file has been received (step S304: YES), the video reproduction unit 324 reads frame image data corresponding to the current reproduction position from the video segment file (step S305).

Subsequently, the video reproduction unit 324 determines whether or not second timing information associated with the read frame image data is included in the video segment file (step S306). If the second timing information is not included (step S306: NO), the video reproduction unit 324 displays a frame image on the display unit 37 based on the read frame image data (step S307). On the other hand, when the second timing information is included (step S306: YES), the video reproduction unit 324 reads first timing information that is the same as the first timing information included in the second timing information from a segment file of the piece of music. Then, the video reproduction unit 324 reads a sound fragment associated with the first timing information from the segment file of the piece of music (step S308). Subsequently, the video reproduction unit 324 displays a frame image on the display unit 37 based on the read frame image data, and reproduces a sound based on the read sound fragment (step S309).

After step S307 or S309, the video reproduction unit 324 shifts the reproduction position of the video by a display duration of the frame image in the direction of the end of the video (step S310). Subsequently, the video reproduction unit 324 determines whether or not the user has performed an operation to change the reproduction position of the video (step S311). Examples of changing the reproduction position include fast forward, rewind, skip, and seek. When the reproduction position has been changed (step S311: YES), the video reproduction unit 324 changes the sequence number of a video segment file to be received in the video/sound reception process according to the changed reproduction position (step S312). After step S312, the process proceeds to step S304.

On the other hand, when the reproduction position has not been changed (step S311: NO), the video reproduction unit 324 determines whether or not the user U2 has performed an operation to pause the video (step S313). When the pause operation has been performed (step S313: YES), the video reproduction unit 324 determines whether or not the user U2 has performed an operation to cancel the pause of the video (step S314). When the pause has not been canceled (step S314: NO), the determination in step S314 is executed again.

When the pause operation has not been performed (step S313: NO) or when the pause has been canceled (step S314: YES), the video reproduction unit 324 determines whether or not reproduction of the video is finished (step S315). When the reproduction of the video is not finished (step S315: NO), the process proceeds to step S305. On the other hand, when the reproduction of the video is finished (step S315: YES), the video reproduction process is finished.

As described above, according to the present embodiment, the video content creator terminal 3-1 receives sound information from the music distribution server 2. The video content creator terminal 3-1 receives the first timing information indicating one or more timings of reproducing one or more sounds indicated by the received sound information from the music distribution server 2. The video content creator terminal 3-1 causes the video-taking unit 39 to take a video. When the video is being taken by the video-taking unit 39, the video content creator terminal 3-1 reproduces the one or more sounds indicated by the received sound information. When the one or more sounds indicated by the received sound information are being reproduced, the video content creator terminal 3-1 identifies one or more timings of reproducing the one or more sounds indicated by the sound information based on the received first timing information. The video content creator terminal 3-1 causes video information indicating the taken video and including the second timing information indicating the identified reproduction timings to be generated. The viewer terminal 3-2 receives the video information generated by control of the video content creator terminal 3-1 from the video distribution server 1. The viewer terminal 3-2 receives sound information from the music distribution server 2. The viewer terminal 3-2 reproduces a video indicated by the received video information and one or more sounds indicated by the received sound information. At this time, the viewer terminal 3-2 synchronizes the video with the one or more sounds based on the second timing information included in the received video information.

Therefore, when the one or more sounds are being reproduced during taking a video, the one or more timings of reproducing the one or more sounds are identified based on the first timing information, and video information including second timing information indicating the identified reproduction timings is generated. When the viewer terminal 3-2 reproduces a video, the viewer terminal 3-2 reproduces the video based on the video information, receives sound information from the music distribution server 2, and reproduces the one or more sounds based on the sound information. Here, the viewer terminal 3-2 synchronizes the video with the one or more sounds based on the second timing information included in the video information to perform the reproduction. In this way, the viewer terminal 3-2 reproduces the one or more sounds based on the sound information distributed from the music distribution server 2. Therefore, deterioration of the quality of the one or more sounds reproduced at the time of taking the video is prevented, and the taken video can be reproduced in a video sharing platform.

Here, the video content creator terminal 3-1 may receive first timing information indicating a reproduction timing of each of a plurality of portions constituting the one or more sounds and having different reproduction timings. The video content creator terminal 3-1 may identify a reproduction timing corresponding to a portion which is being reproduced in the one or more sounds indicated by the sound information based on the received first timing information. The video content creator terminal 3-1 may cause the video information including the second timing information indicating the identified reproduction timing in association with a frame whose video-taken timing corresponds to the identified reproduction timing among a plurality of frames constituting the video to be generated.

In this case, a reproduction timing is identified for each of the plurality of portions constituting the one or more sounds, and the second timing information associated with the frame corresponding to the identified reproduction timing among the plurality of frames constituting the video is included in the video information. When the viewer terminal 3-2 displays a frame associated with the second timing information included in the video information, the viewer terminal 3-2 reproduces a portion corresponding to the second timing information among the plurality of portions constituting the one or more sounds. Therefore, the video is appropriately synchronized with the one or more sounds, and the video can be reproduced.

The video content creator terminal. 3-1 may cause the video information indicating the video without the one or more sounds reproduced at the time of taking the video to be generated.

In this case, since the one or more sounds reproduced at the time of taking the video are not recorded in the video, the viewer terminal 3-2 does not reproduce deteriorated sounds when the viewer terminal 3-2 reproduces the video. Since the viewer terminal. 3-2 reproduces the one or more sounds based on the sound information distributed from the music distribution server 2, deterioration of the sound quality can be prevented.

2. Second Embodiment

Next, a second embodiment will be described with reference to FIGS. 14 and 15. In the present embodiment, the video distribution system S generates video information with sounds while suppressing recording of one or more sounds reproduced during taking a video.

A video generation control unit 316 of a video content creator terminal 3-1 removes one or more sounds different from human voices from one or more input sounds input using the sound collecting unit 40 when a video is being taken by the video-taking unit 39. For example, the video generation control unit 316 receives an input sound signal from the sound collecting unit 40. The video generation control unit 316 converts this input sound signal into digital input sound data. The video generation control unit 316 performs, for example, a Fourier transform on the input sound data to obtain a frequency domain representation of the one or more input sounds. The video generation control unit 316 generates, from the input sound data, recorded sound data from which one or more sounds having frequencies outside a predetermined range (for example, 100 Hz-1000 Hz) as a frequency range of human voices has been removed. At this time, one or more sounds other than human voices may be included in the one or more sounds having the frequencies within the frequency range of human voices.

The video generation control unit 316 causes video information including the one or more input sounds from which the one or more sounds different from human voices has been removed to be generated. For example, the video generation control unit 316 may encode recorded sound data from which the one or more sounds having the frequencies outside the frequency range of human voices has been removed to generate fragments of the recorded sounds. The video generation control unit 316 may transmit recorded sound fragments to the video distribution server 1. In this case, the video distribution server 1 may generate video data or a segment file including the frame image data, the recorded sound fragments, and the second timing information received from the video content creator terminal 3-1. Alternatively, the video generation control unit 316 may generate video data or a segment file including the frame image data, the recorded sound fragments, and the second timing information.

When one or more sounds reproduced during taking a video does not include human voices, recording of the one or more sounds in the video information is suppressed by the above-described function. Thereafter, when the viewer terminal 3-2 reproduces the video, the one or more sounds are reproduced based on sound information of the one or more sounds. On the other hand, the viewer terminal 3-2 reproduces the video including human voices. Therefore, deterioration of the one or more sounds reproduced can be prevented, and human voices can be recorded in the video during taking the video.

The video content creator terminal 3-1 may control whether or not to record the one or more input sounds input from the sound collecting unit 40 based on instructions from the user U1. Alternatively, the music distribution server. 2 may transmit information indicating whether or not a piece of music selected by the user U1 includes human voices to the video content creator terminal 3-1. The video content creator terminal 3-1 may control whether or not to record the one or more input sounds based on the information received from the music distribution server 2.

The video generation control unit 316 may add the waveform of one or more sounds indicated by the input sound data and the waveform of the opposite phase of the waveform of one or more sounds reproduced by the sound reproduction unit 314 to generate recorded sound data. As a result, the one or more sounds reproduced during taking the video can be removed to some extent from the one or more input sounds.

Figure 14:
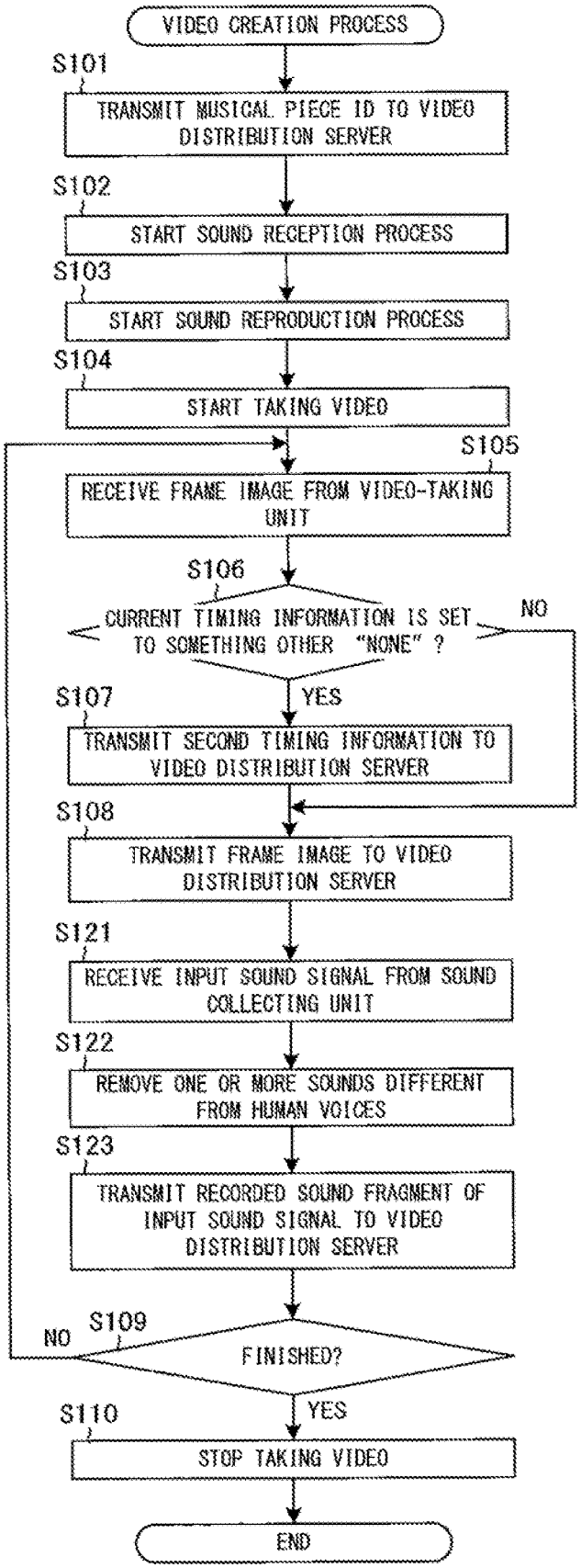
FIG. 14 is a flowchart illustrating an example of a video creation process by a system controller of a video content creator terminal.

FIG. 14 is a flowchart illustrating an example of a video creation process by a system controller 31 of the video content creator terminal 3-1. In FIG. 14, the same reference numerals are assigned to the same steps as in FIG. 11.

As illustrated in FIG. 14, steps 101 to S108 are executed first in the same manner as the case of the first embodiment. After step S108, the video generation control unit 316 receives an input sound signal from the sound collecting unit 40 (step S121). The video generation control unit 316 converts the input sound signal into input sound data. Subsequently, the video generation control unit 316 generates recorded sound fragments obtained by removing one or more sounds different from human voices from the input sound data (step S122). Subsequently, the video generation control unit 316 transmits the generated recorded sound fragments to the video distribution server 1 (step S123).

Subsequently, the video generation control unit 316 determines whether or not the user U1 has given instructions to finish taking the video (step S109). If the user U1 has not given instructions to finish taking the video (step S109: NO), the process proceeds to step S105. On the other hand, when the user U1 has given instructions to finish taking the video (step S109: YES), the video-taking control unit 313 causes the video-taking unit 39 to stop taking the video (step 110), and the video creation process is finished.

Figure 15:
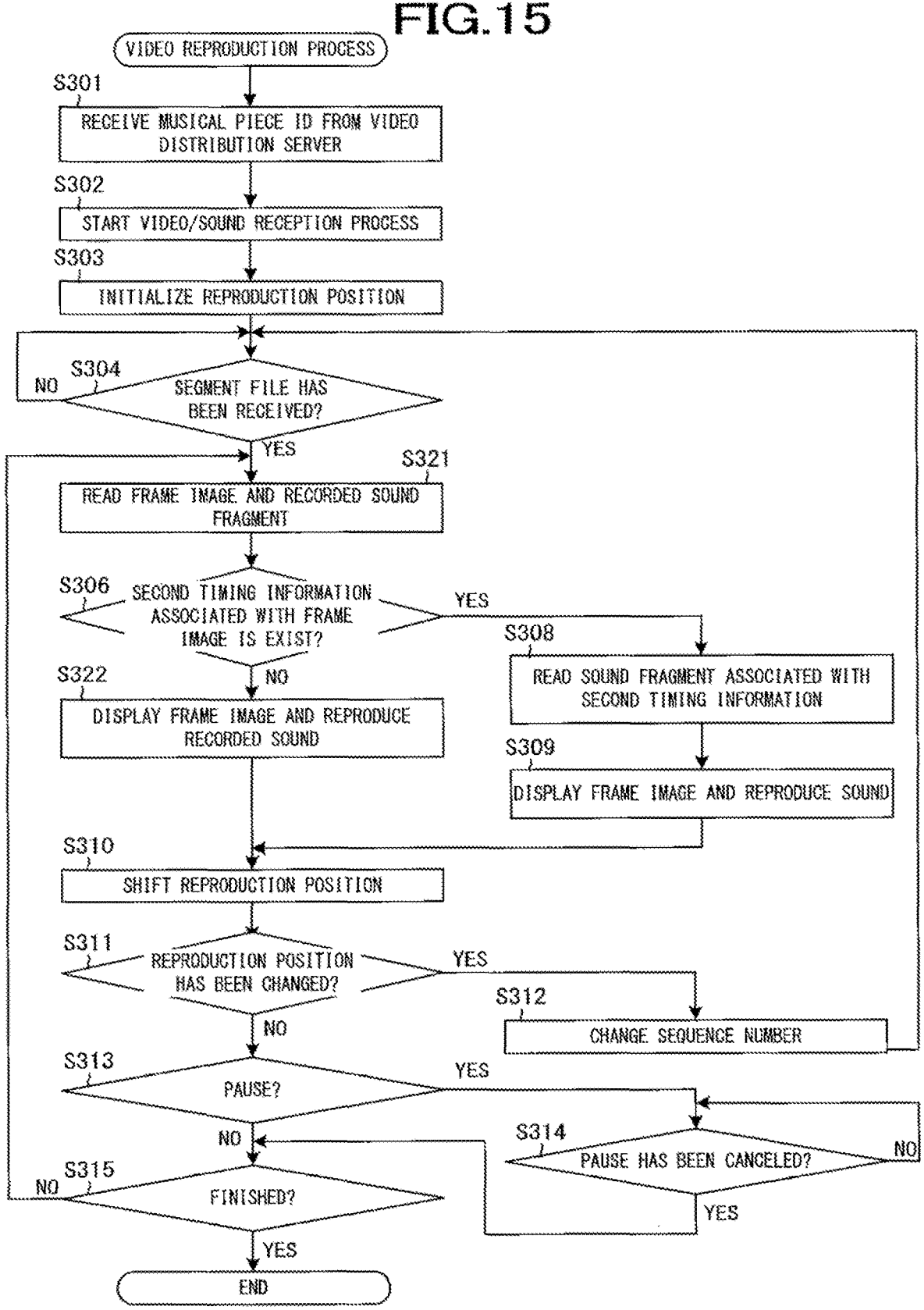
FIG. 15 is a flowchart illustrating an example of a video reproduction process by a system controller of a viewer terminal.

FIG. 15 is a flowchart illustrating an example of a video reproduction process by a system controller 31 of the viewer terminal 3-2. In FIG. 15, the same steps as in FIG. 13 are designated by the same reference numerals.

As illustrated in FIG. 15, steps S301 to S304 are executed first in the same manner as the case of the first embodiment. If any video segment file has been received (step S304: YES), the video reproduction unit 324 reads frame image data and a recorded sound fragment corresponding to the current reproduction position from the video segment file (step S321). Subsequently, the video reproduction unit 324 determines whether or not the second timing information associated with the read frame image data is included in the video segment file (step S306). If the second timing information is not included (step S306: NO), the video reproduction unit 324 displays a frame image on the display unit 37 based on the read frame image data, and reproduces a recorded sound based on the read recorded sound fragment (step S322). On the other hand, when the second timing information is included (step S306: YES), the video reproduction unit 324 reads first timing information that it the same as the first timing information included in the second timing information from a segment file of the piece of music. Then, the video reproduction unit 324 reads a sound fragment associated with the first timing information from the segment file of the piece of music (step S308). Subsequently, the video reproduction unit 324 displays a frame image on the display unit 37 based on the read frame image data, and reproduces a sound of the piece of music based on the read sound fragment. At the same time, the video reproduction unit 324 reproduces a sound based on the read recorded sound fragment (step S313).

After step S322 or S323, steps S310 to S315 are executed as in the first embodiment.

As described above, according to the present embodiment, the video content creator terminal 3-1 removes one or more sounds different from human voices from one or more input sounds input using the sound input means when a video is being taken by the video-taking unit 39. In addition, the video content creator terminal 3-1 generates the video information indicating the video including the one or more input sounds from which the one or more sounds different from human voices has been removed.

Therefore, while human voices are recorded in the video at the time of taking the video, recording of one or more sounds different from human voices is suppressed. Therefore, when one or more sounds reproduced at the time of taking the video do not include human voices, recording of these one or more sounds is suppressed.

When the viewer terminal 3-2 reproduces the video, the viewer terminal 3-2 reproduces recorded human voices and also reproduces one or more sounds based on sound information distributed from the music distribution server 2. Therefore, it is possible to reproduce voices uttered by a human at the time of taking the video together with the video while preventing deterioration of one or more sounds reproduced at the time of taking the video.

3. Third Embodiment

Next, a third embodiment will be described with reference to FIGS. 16 and 17. In the present embodiment, a video distribution system S makes reproduction of a plurality of sets of one or more sounds possible during taking a video. When reproducing the video, the video distribution system S synchronizes each of the plurality of sets of one or more sounds with the video and reproduces the plurality of sets of one or more sounds.

A sound reception unit 311 of the video content creator terminal 3-1 receives one or more pieces of sound information indicating one or more sets of one or more sounds, respectively, from the music distribution server 2.

The timing information reception unit 312 receives first timing information for each of the one or more pieces of sound information received by the sound reception unit 311.

A sound reproduction unit 314 reproduces one or more sets of one or more sounds indicated by the one or more respective pieces of sound information received from the music distribution server 2 when a video is being taken by the video-taking control unit 313. When the sound reproduction unit 314 reproduces a plurality of sets of one or more sounds, a reproduction period of one set of one or more sounds may overlap with a reproduction period of another set of one or more sounds or may not overlap therewith. The plurality of sets of one or more sounds may be reproduced successively. The sound reproduction unit 314 may start reproducing each of the plurality of sets of one or more sounds at timings designated by a user U1.

When one or more sounds indicated by sound information are being reproduced by the sound reproduction unit 314, the timing identification unit 315 identifies, for each of one or more sets of one or more sounds reproduced by the sound reproduction unit 314, one or more timings of reproducing a set of one or more sounds indicated by the sound information based on the first timing information received by the timing information reception unit 312.

The video generation control unit 316 includes, for each of the one or more sets of one or more sounds reproduced by the sound reproduction unit 314, second timing information indicating the reproduction timing identified by the timing identification unit 315 and identification information for identifying the set of one or more sounds in video information to be generated. As a result, it is possible to identify which of the one or more sets of one or more sounds the second timing information corresponds to. The identification information may be, for example, the musical piece ID.

The sound reception unit 322 of the viewer terminal 3-2 receives one or more pieces of sound information from the music distribution server 2. Specifically, the sound reception unit 322 receives the one or more pieces of sound information indicating the one or more sets of one or more sounds reproduced at the time of taking the video by the sound reproduction unit 314 of the video content creator terminal 3-1 used for creating video data received by the video reception unit 321.

The timing information reception unit 312 receives first timing information indicating one or more timings of reproducing one or more sets of one or more sounds indicated by one or more pieces of sound information received by the sound reception unit 322 from the music distribution server 2.

The video reproduction unit 324 reproduces the video indicated by the video information received by the video reception unit 321 and the one or more sets of one or more sounds indicated by the one or more pieces of sound information received by the sound reception unit 322. At this time, the video reproduction unit 324 synchronizes the video with each of the one or more sets of one or more sounds based on the second timing information included in the video information received by the video reception unit 321. Since the second timing information includes identification information, it is possible to determine one or more sounds to be synchronized with the video. Therefore, even when a plurality of sets of one or more sounds are reproduced during takin a video, the video can be synchronized with the plurality of sets of one or more sounds at the time of reproducing the video. Therefore, deterioration of the plurality of sets of one or more sounds can be prevented.

As in the case of the first embodiment, the second timing information may be included in the video information in units of one or more successive frame images for each of the plurality of sets of one or more sounds. As a result, the video and each of the plurality of sets of one or more sounds can be appropriately synchronized with each other and reproduced.

As in the case of the second embodiment, one or more input sounds from the sound collecting unit 40 may be recorded or may not be recorded.

Figure 16:
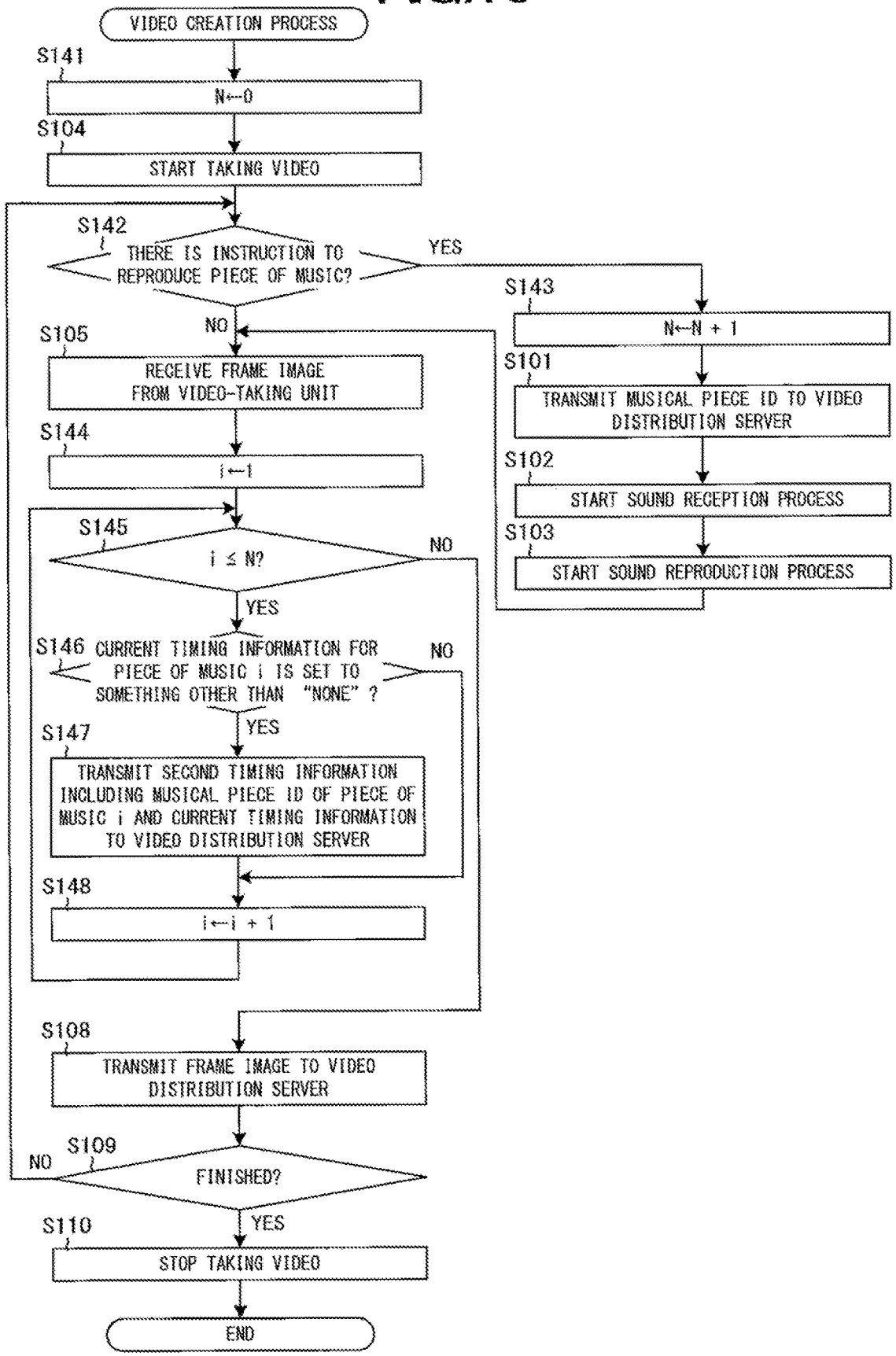
FIG. 16 is a flowchart illustrating an example of a video creation process by a system controller of a video content creator terminal.

FIG. 16 is a flowchart illustrating an example of a video creation process by a system controller 31 of the video content creator terminal 3-1. In FIG. 16, the same reference numerals are assigned to the same steps as in FIG. 11.

As illustrated in FIG. 16, the video generation control unit 316 sets the number of pieces of music N to 0 (step S141). Subsequently, the video-taking control unit 313 causes the video-taking unit 39 to start taking a video (step S104). Subsequently, the sound reproduction unit 314 determines whether or not the user U1 has given instructions to reproduce any piece of music based on a signal from the input unit 36 (step S142). If instructions to reproduce any piece of music have been given (step S143), the video generation control unit 316 increases the number of pieces of music N by 1 (step S143). Subsequently, the video generation control unit 316 transmits a musical piece ID of the piece of music selected by the user U1 to the video distribution server 1 (step S101). Subsequently, the system controller 31 starts the sound reception process (step S102) and starts the sound reproduction process (step S103). In the sound reception process and the sound reproduction process, sound data of the piece of music selected this time by the user U1 is received, and the piece of music is reproduced. The number of the selected piece of music is represented by a piece of music N.

If instructions to reproduce any piece of music have not been given (step S142), or after step S103, the video-taking control unit 313 receives frame image data from the video-taking unit 39 (step S105). Subsequently, the timing identification unit 315 sets the musical piece number i to 1 (step S144). Subsequently, the timing identification unit 315 determines whether or not the musical piece number i is equal to or less than the number of pieces of music N (step S145). If the musical piece number i is equal to or less than the number of pieces of music N (step S145: YES), the timing identification unit 315 determines whether or not the current timing information for the musical piece number i is set to something other than "none" (step S146). If the current timing information is set to something other than "none" (step S146: YES), the video generation control unit 316 transmits the second timing information including the musical piece ID of the piece of music i and the current timing information to the video distribution server 1 in association with the received frame image data (step S147). After step S147 or if the current timing information is set to "none" (step S146: NO), the timing identification unit 315 increases the musical piece number i by 1 (step S148). After step S148, the process proceeds to step S145.

If the musical piece number i is not equal to or less than the number of pieces of music N (step S145: NO), the video generation control unit 316 transmits the frame image data received from the video-taking unit 39 to the video distribution server 1 (step S108). Subsequently, the video generation control unit 316 determines whether or not the user U1 has given instructions to finish taking the video (step S109). If the user U1 has not given instructions to finish taking the video (step S109: NO), the process proceeds to step S142. On the other hand, when the user U1 has given instructions to finish taking the video (step S109: YES), the video-taking control unit 313 causes the video-taking unit 39 to stop taking the video (step S110), and the video creation process is finished.

The video distribution server 1 store video data or a segment file including the frame image data and the second timing information received from the video content creator terminal 3-1 in the video DB in association with one or more musical piece IDs received from the video content creator terminal. 3-1 and a new video ID.

Figure 17:
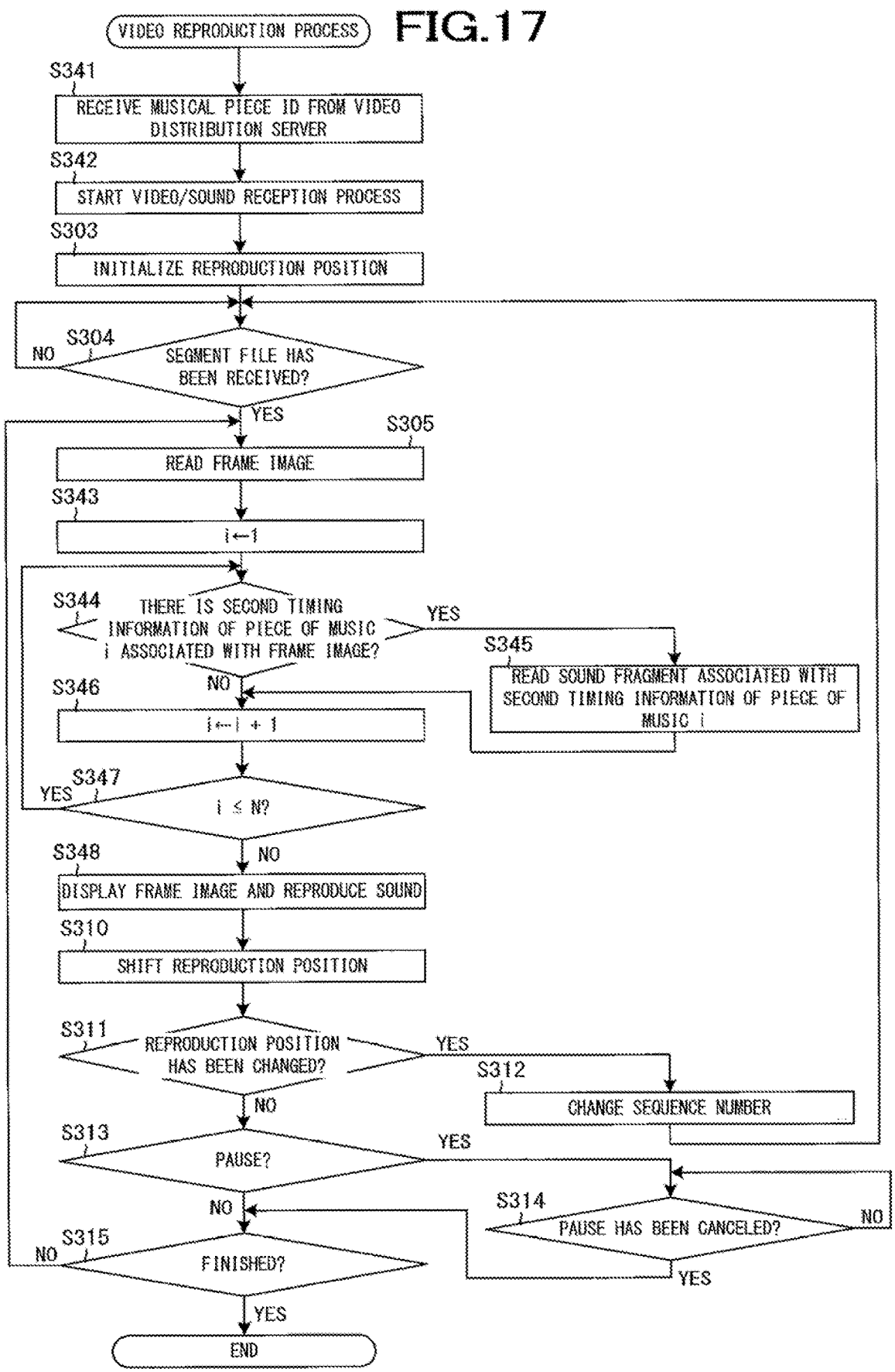
FIG. 17 is a flowchart illustrating an example of a video reproduction process by a system controller of a viewer terminal.

FIG. 17 is a flowchart illustrating an example of a video reproduction process by the system controller 31 of the viewer terminal 3-2. In FIG. 17, the same reference numerals are assigned to the same steps as in FIG. 11.

As illustrated in FIG. 17, the video reproduction unit 324 transmits a video ID of a video selected by a user U2 to the video distribution server 1, and thereby receives one or more musical piece IDs stored in the video DB in association with the video ID (step S341). Subsequently, the system controller 31 starts a video/sound reception process (step S342). In the video/sound reception process, a segment file is received from the music distribution server 2 for one or more pieces of music indicated by the one or more received musical piece IDs. In other respects, the video/sound reception process in step S342 is the same as the video/sound reception process in step S302 illustrated in FIG. 11. Subsequently, the video reproduction unit 324 initializes a reproduction position of the video (step S303). Subsequently, the video reproduction unit 324 determines whether or not any video segment file has been received in the video reception process (step S304). If any segment file has not been received (step S304: NO), the determination in step S304 is executed again. On the other hand, when any segment file has been received (step S304: YES), the video reproduction unit 324 reads frame image data corresponding to the current reproduction position from the video segment file (step S305).

Subsequently, the video reproduction unit 324 sets the musical piece number i to 1 (step S343). Subsequently, the video reproduction unit 324 determines whether or not the second timing information associated with the read frame image data and including the musical piece ID of a piece of music i among the one or more musical piece IDs received from the video distribution server 1 is included in the video segment file (step S344). If the second timing information is included (step S344: YES), the video reproduction unit 324 reads first timing information that is the same as the first timing information included in the second timing information from a segment file of the piece of music i. Then, the video reproduction unit 324 reads a sound fragment associated with the first timing information from the segment file of the piece of music i (step S345).

After step S345 or if the second timing information is not included (step S344: NO), the video reproduction unit 324 increases the musical piece number i by 1 (step S346). Subsequently, the video reproduction unit 324 determines whether or not the musical piece number i is equal to or less than the number of pieces of music N (step S347). If the musical piece number i is equal to or less than the number of pieces of music N (step S347; YES), the process proceeds to step S344. On the other hand, when the musical piece number i is not equal to or less than the number of pieces of music N (step S347: NO), the video reproduction unit 324 displays a frame image on the display unit 37 based on the read frame image data, and reproduces, for each of the pieces of music whose sound fragment has been read in step S345 among the one or more pieces of music, a sound of the piece of music based on the sound fragment (step S348). If any sound fragment has not been read for any of the pieces of music, the video reproduction unit 324 only displays the frame image. After step S348, steps S310 to S315 are executed as in the case of the first embodiment.

As described above, according to the present embodiment, the video content creator terminal 3-1 receives one or more pieces of sound information indicating one or more respective sets of one or more sounds. The video content creator terminal 3-1 receives the first timing information for each of the one or more sets of one or more sounds. The video content creator terminal 3-1 reproduces the one or more sets of one or more sounds. The video content creator terminal 3-1 identifies one or more reproduction timings for each of the one or more sets of one or more sounds based on the first timing information. The video content creator terminal 3-1 includes, for each of the one or more sets of one or more sounds, the second timing information indicating the identified reproduction timings and the identification information for identifying the sound information in generated video information.

Therefore, when one or more sets of one or more sounds are reproduced at the time of taking a video, the video information includes the second timing information including the identification information for identifying sound information of each of the one or more sets of one or more sounds. When reproducing the video, the viewer terminal 3-2 can identify sound information used for reproducing a set of one or more sounds based on the identification information included in the second timing information. Therefore, even when a plurality of sets of one or more sounds is reproduced at the time of taking the video, it is possible to reproduce the taken video while preventing the quality of each of the plurality of reproduced sets of one or more sounds from deteriorating.

The invention claimed is:
1. A video distribution system comprising:
a video generation device configured to generate video information indicating a video,
a reproduction device configured to reproduce the video; and
a distribution apparatus, wherein the distribution apparatus includes:
at least one memory configured to store sound distribution computer program code and video distribution computer program code; and
at least one distribution processor configured to access the sound distribution computer program code and the video distribution computer program code, and operate according to the sound distribution computer program code and the video distribution computer program code, the sound distribution computer program code comprising:
first sound information transmission code configured to cause at least one of the at least one distribution processor to transmit sound Information indicating one or more sounds to the video generation device;
timing information transmission code configured to cause at least one of the at least one distribution processor to transmit first timing information indicating one or more timings of reproducing the one or more sounds to the video generation device; and
second sound information transmission code configured to cause at least: one of the at least one distribution processor to transmit the sound information to the reproduction device,
the video distribution computer program code comprising:
video information reception code configured to cause at least one of the at least one distribution processor to receive the video information from the video generation device; and
received video information transmission code configured to cause at least one of the at least one distribution processor to transmit the received video information to the reproduction device;

the video generation device includes:
at least one memory configured to store generation computer program code; and
at least one generation processor configured to access the generation computer program code and operate according to the generation computer program code, the generation computer program code comprising:
sound information reception code configured to cause at least one of the at least one generation processor to receive the sound information from the distribution apparatus;
timing information reception code configured to cause at least one of the at least one generation processor to receive the first timing information from the distribution apparatus;
video-taking control code configured to cause at least one of the at least one generation processor to cause a video-taking device to take the video;
sound reproduction code configured to cause at least one of the at least one generation processor to reproduce, when the video is being taken by the video-taking device, the one or more sounds indicated by the received sound information;
timing identification code configured to cause at least one of the at least one generation processor to identify, when the one or more sounds are being reproduced by the sound reproduction code, one or more timings of reproducing the one or more sounds indicated by the received sound information based on the received first timing information; and
taken video information transmission code configured to cause at least one of the at least one generation processor to transmit the taken video to the distribution apparatus, and
the reproduction device includes:
at least one memory configured to store reproduction computer program code; and
at least one reproduction processor configured to access the reproduction computer program code and operate according to the reproduction computer program code, the reproduction computer program code comprising:
reproducible video information reception code configured to cause at least one of the at least one reproduction processor to receive the video information from the distribution apparatus;
reproducible sound information reception code configured to cause at least one of the at least one reproduction processor to receive the sound information from the distribution apparatus; and
video reproduction code configured to cause at least one of the at least one reproduction processor to reproduce the video indicated by the received video information and the one or more sounds indicated by the received sound information, and
wherein the received video information transmission code is configured to cause at least one of the at least one distribution processor to transmit the video information including second timing information indicating the one or more timings of the reproduction identified by the timing identification code, and
the video reproduction code is configured to cause at least one of the at least one reproduction processor to synchronize the video with the one or more sounds based on the second timing information included in the video information received by the reproducible video information reception code.

2. The video distribution system according to claim 1, wherein
the timing information transmission code is configured to cause at least one of the at least one distribution processor to transmit the first timing information indicating timings of reproducing respective portions included in the one or more sounds, the timings of reproducing the portions different from each other;
the timing identification code is configured to cause at least one of the at least one generation processor to identify, based on the received first timing information, a reproduction timing corresponding to a portion, among the portions included in the one or more sounds indicated by the received sound information, being reproduced by the sound reproduction code, and
the received video information transmission code is configured to cause at least one of the at least one distribution processor to transmit the video information including the second timing information indicating the identified reproduction timing in association with a frame among frames included in the video, a timing when the frame has been taken by the video-taking device corresponding to the identified reproduction timing.

3. The video distribution system according to claim 1, wherein
the taken video information transmission code is configured to cause at least one of the at least one generation processor to transmit the video information indicating the video without the one or more sounds reproduced by the sound reproduction code.

4. The video distribution system according to claim 1, wherein
the generation computer program code further comprises:
obtaining code configured to cause at least one of the at least one generation processor to obtain one or more sounds that are input using a sound input device when the video is being taken by the video-taking device; and
the removal code configured to cause at least one of the at least one generation processor to remove one or more sounds different from human voices from the one or more input sounds, and
the taken video information transmission code is configured to cause at least one of the at least one generation processor to transmit the video information indicating the video including the one or more input sounds except for the one or more removed sounds.

5. The video distribution system according to claim 1, wherein
the first sound information transmission code Is configured to cause at least one of the at least one distribution processor to transmit, for each of one or more sets of one or more sounds, the sound information indicating a respective sets of one or more sounds,
the timing information transmission code is configured to cause at least one of the at least one distribution processor to transmit, for each of the one or more sets of one or more sounds, the first timing information,
the sound reproduction code is configured to cause at least one of the at least one generation processor to reproduce the one or more sets of one or more sounds,
the timing identification code is configured to cause at least one of the at least one generation processor to identify, for each of the one or more sets of one or more sounds, one or more timings of the reproduction based on the corresponding first timing information, and
the received video information transmission code is configured to cause at least one of the at least one distribution processor to transmit the video information including, for each of the one or more sets of one or more sounds, the second timing information indicating the one or more identified timings of the reproduction and identification information for identifying the corresponding sound information.

6. The video distribution system according to claim 1, wherein
the distribution apparatus Includes a sound distribution device and a video distribution device different from the sound distribution device,
the sound distribution device includes:
at least one memory configured to store the sound distribution computer program code, and
at least one processor configured to access the sound distribution computer program code and operate according to the sound distribution computer program code, and
the video distribution device includes:
at least one memory configured to store the video distribution computer program code, and
at least one processor configured to access the video distribution computer program code and operate according to the video distribution computer program code.

7. The video distribution system according to claim 1, wherein
the sound distribution computer program code further comprises a second timing information transmission code configured to cause at least one of the at least one distribution processor to transmit the first timing information to the reproduction device,
the reproduction computer program code further comprises a second timing information reception code configured to cause at least one of the at least one reproduction processor to receive the first timing information from the distribution apparatus, and
the video reproduction code is configured to cause at least one of the at least one reproduction processor to synchronize the video with the one or more sounds based on the received first timing information and the second timing information.

8. A video generation method performable by a computer, the method comprising:
receiving sound information indicating one or more sounds from a distribution apparatus configured to distribute the sound information;
receiving first timing information indicating one or more timings of reproducing the one or more sounds from the distribution apparatus;
causing a video-taking device to Lake the video;
reproducing, when the video is being taken by the video-taking device, the one or more sounds indicated by the received sound information;
identifying, when the one or more sounds indicated by the received sound information are being reproduced, the one or more timings of reproducing the one or more sounds indicated by the received sound information based on the received first timing information; and
causing video information indicating the taken video to be generated, the video information including second timing information indicating the one or more identified timings.

9. A reproduction device comprising:
at least one memory configured to store computer program code; and
at least one processor configured to access the computer program code and operate according to the computer program code, the computer program code comprising:
video information reception code configured to cause at least one of the at least one processor to receive video information indicating a video, the video information generated according to control by a video generation device;
sound information reception code configured to cause at least one of the at least one processor to receive sound information indicating one or more sounds; and
video reproduction code configured to cause at least one of the at least one processor to reproduce the video indicated by the received video information and the one or more sounds indicated by the received sound information,
wherein the video has been taken by a video-taking device,
the video generation device is configured to reproduce the one or more sounds indicated by the sound information when the video is being taken by the video-taking device, identify one or more timings of reproducing the one or more sounds when the one or more sounds are being reproduced by the video generation device, and cause the video information including second timing information indicating the one or more identified timings to be generated, and
the video reproduction code is configured to cause at least one of the at least one processor to synchronize the video with the one or more sounds based on the second timing information included in the received video information.

10. The reproduction device according to claim 9, wherein
the computer program code further comprises a timing information reception code configured to cause at least one of the at least one processor to receive first timing information indicating one or more timings of reproducing the one or more sounds, and
the video reproduction code is configured to cause at least one of the at least one processor to synchronize the video with the one or more sounds based on the received first timing information and the second timing information.

* * * * *